US012671688B2

(12) United States Patent (10) Patent No.: US 12,671,688 B2
Bavaro (45) Date of Patent: Jun. 30, 2026

(54) SECURE MULTI-USER BIOMETRIC TEMPLATE AUTHENTICATION

(71) Applicant: Hand Held Products, Inc., Charlotte, NC (US)

(72) Inventor: Bryan Bavaro, Waxhaw, NC (US)

(73) Assignee: Hand Held Products, Inc., Charlotte, NC (US)

( * ) Notice: Subject to any disclaimer, the term of this patent is extended or adjusted under 35 U.S.C. 154(b) by 524 days.

(21) Appl. No.: 18/316,773

(22) Filed: May 12, 2023

(65) Prior Publication Data

US 2024/0380751 A1 Nov. 14, 2024

(51) Int. Cl.
*G06F 21/00* (2013.01)
*H04L 9/40* (2022.01)

(52) U.S. Cl.
CPC ........ *H04L 63/0861* (2013.01); *H04L 63/083* (2013.01)

(58) Field of Classification Search
CPC ... H04L 63/0861; H04L 63/083; H04L 67/06; H04L 67/55; H04L 67/562; H04L 63/0435; H04L 2463/082; H04L 67/1001; H04W 12/37; H04W 12/77; H04W 12/069; G06F 2221/2117; G06F 21/32; G06F 21/602
See application file for complete search history.

(56) References Cited

U.S. PATENT DOCUMENTS

| | | | | |
|---|---|---|---|---|
| 9,871,770 B2 * | 1/2018 | O'Hare | ............... | H04L 63/0823 |
| 10,103,948 B1 | 10/2018 | Hosea et al. | | |
| 10,764,270 B2 * | 9/2020 | Hayes | ................... | H04L 9/3239 |
| 12,417,269 B2 * | 9/2025 | Mehrtash | ........... | G06Q 20/4014 |
| 2004/0250085 A1 | 12/2004 | Tattan et al. | | |
| 2011/0314304 A1 * | 12/2011 | Braams | ................... | G06F 21/78 713/193 |
| 2014/0365782 A1 * | 12/2014 | Beatson | ............. | G06V 30/1478 713/186 |

(Continued)

FOREIGN PATENT DOCUMENTS

| | | |
|---|---|---|
| EP | 1425645 B1 | 9/2010 |
| EP | 3611871 B1 | 12/2021 |
| EP | 4083827 A1 | 11/2022 |

OTHER PUBLICATIONS

Extended European Search Report Mailed on Jun. 13, 2024 for EP Application No. 24168482, 8 page(s).

*Primary Examiner* — Kendall Dolly
(74) *Attorney, Agent, or Firm* — Alston & Bird LLP

(57) ABSTRACT

Embodiments relate to secure multi-user biometric template authentication (MBTA) for mobile computing devices. In an embodiment, a request to generate a biometric template (BT) associated with an end user is generated via a first mobile computing device associated with an MBTA system. In response to the request, biometric data associated with the end user is collected and a BT associated with the end user is generated based on the biometric data. In embodiments, a personal identification number (PIN) is generated and associated with the BT related to the end user. The BT and/or the PIN associated with the end user are stored in an active BT database and/or an active PIN database respectively. MBTA data associated with the active BT database and/or the active PIN database is transmitted for storage on a plurality of mobile computing devices that are different than the first mobile computing device.

20 Claims, 12 Drawing Sheets

(56)        References Cited

U.S. PATENT DOCUMENTS

| | | | |
|---|---|---|---|
| 2015/0016697 A1 | 1/2015 | Kerr | |
| 2015/0067775 A1 | 3/2015 | Cardone et al. | |
| 2015/0082024 A1* | 3/2015 | Smith | H04L 63/0861 |
| | | | 713/155 |
| 2016/0164849 A1 | 6/2016 | Smith | |
| 2017/0034307 A1 | 2/2017 | Singh et al. | |
| 2019/0158487 A1* | 5/2019 | Hayes | H04L 63/0861 |
| 2022/0303260 A1 | 9/2022 | Yao | |
| 2022/0368690 A1 | 11/2022 | Hayes et al. | |
| 2022/0407853 A1* | 12/2022 | Henry | G06N 20/00 |
| 2023/0011336 A1 | 1/2023 | Inoue et al. | |
| 2023/0262054 A1* | 8/2023 | Marasco | H04L 63/0861 |
| | | | 726/4 |
| 2024/0244048 A1* | 7/2024 | Traywick | H04L 9/3231 |

* cited by examiner

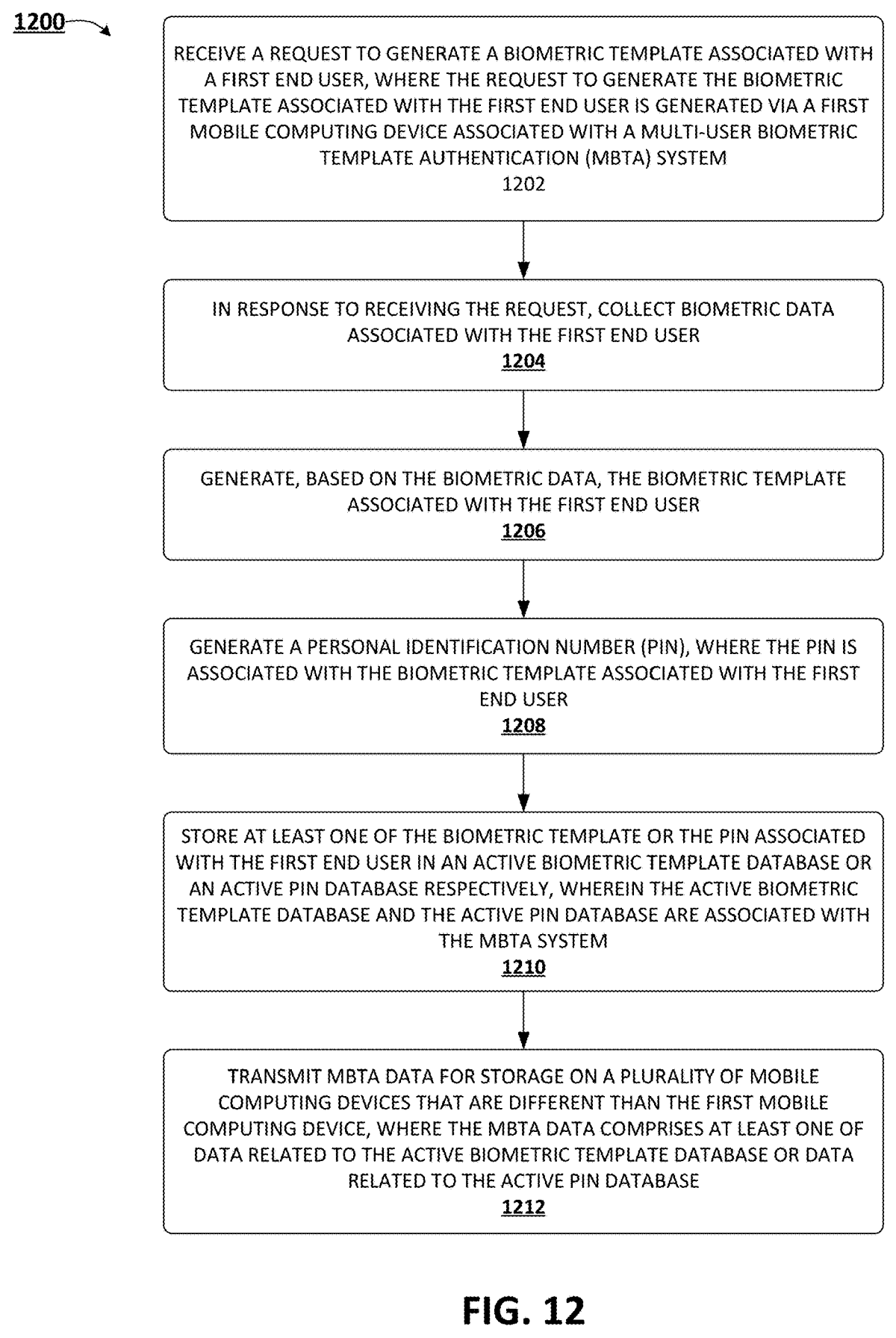

1200

RECEIVE A REQUEST TO GENERATE A BIOMETRIC TEMPLATE ASSOCIATED WITH A FIRST END USER, WHERE THE REQUEST TO GENERATE THE BIOMETRIC TEMPLATE ASSOCIATED WITH THE FIRST END USER IS GENERATED VIA A FIRST MOBILE COMPUTING DEVICE ASSOCIATED WITH A MULTI-USER BIOMETRIC TEMPLATE AUTHENTICATION (MBTA) SYSTEM
1202

IN RESPONSE TO RECEIVING THE REQUEST, COLLECT BIOMETRIC DATA ASSOCIATED WITH THE FIRST END USER
1204

GENERATE, BASED ON THE BIOMETRIC DATA, THE BIOMETRIC TEMPLATE ASSOCIATED WITH THE FIRST END USER
1206

GENERATE A PERSONAL IDENTIFICATION NUMBER (PIN), WHERE THE PIN IS ASSOCIATED WITH THE BIOMETRIC TEMPLATE ASSOCIATED WITH THE FIRST END USER
1208

STORE AT LEAST ONE OF THE BIOMETRIC TEMPLATE OR THE PIN ASSOCIATED WITH THE FIRST END USER IN AN ACTIVE BIOMETRIC TEMPLATE DATABASE OR AN ACTIVE PIN DATABASE RESPECTIVELY, WHEREIN THE ACTIVE BIOMETRIC TEMPLATE DATABASE AND THE ACTIVE PIN DATABASE ARE ASSOCIATED WITH THE MBTA SYSTEM
1210

TRANSMIT MBTA DATA FOR STORAGE ON A PLURALITY OF MOBILE COMPUTING DEVICES THAT ARE DIFFERENT THAN THE FIRST MOBILE COMPUTING DEVICE, WHERE THE MBTA DATA COMPRISES AT LEAST ONE OF DATA RELATED TO THE ACTIVE BIOMETRIC TEMPLATE DATABASE OR DATA RELATED TO THE ACTIVE PIN DATABASE
1212

FIG. 12

SECURE MULTI-USER BIOMETRIC TEMPLATE AUTHENTICATION

TECHNICAL FIELD

The present disclosure generally relates to aggregating and digitally transforming biometric data, and more particularly to generating biometric templates associated with one or more end users and distributing the biometric templates across multiple mobile computing devices for secure multi-user biometric template authentication purposes.

BACKGROUND

An enterprise may deploy tens or hundreds of mobile computing devices to be used by a workforce associated with the enterprise and, in many contexts, the mobile computing devices may not be directly assigned to respective members of the workforce. As such, various members of the workforce may interact with the same mobile computing device. To ensure the digital security of the data related to the enterprise, the enterprise may employ biometric authentication on the mobile computing devices in order to verify the identity of a particular member of the workforce before the mobile computing devices can be accessed and utilized. Applicant has discovered various problems and inefficiencies related to the traditional deployment of mobile computing devices to be used by a workforce associated with a particular enterprise, solutions for which are described in detail herein.

SUMMARY

The details of some embodiments of the subject matter described in this specification are set forth in the accompanying drawings and the description below. Other features, aspects, and advantages of the subject matter will become apparent from the description, the drawings, and the claims.

In accordance with a first aspect of the present disclosure, a computer-implemented method is provided. The computer-implemented method is performable by one or more specially configured computing device(s) embodied in hardware, software, firmware, and/or any combination thereof, for example as described herein. In one example embodiment, a computer-implemented method includes receiving a request to generate a biometric template associated with a first end user, where the request to generate the biometric template associated with the first end user is generated via a first mobile computing device associated with a multi-user biometric template authentication (MBTA) system. The computer-implemented method also includes, in response to receiving the request, collecting biometric data associated with the first end user. The computer-implemented method also includes generating, based on the biometric data, the biometric template associated with the first end user. The computer-implemented method also includes generating a personal identification number (PIN), where the PIN is associated with the biometric template associated with the first end user. The computer-implemented method also includes storing at least one of the biometric template or the PIN associated with the first end user in an active biometric template database or an active PIN database respectively, where the active biometric template database and the active PIN database are associated with the MBTA system. The computer-implemented method also includes transmitting MBTA data for storage on a plurality of mobile computing devices that are different than the first mobile computing device, where the MBTA data comprises at least one of data related to the active biometric template database or data related to the active PIN database.

The computer-implemented method further includes authenticating, based in part on a first interaction with a second mobile computing device of the plurality of mobile computing devices, the first end user, where the first interaction with the second mobile computing device comprises collecting the biometric data associated with the first end user via the second mobile computing device and utilizing a biometric data matching algorithm to match the biometric data to the biometric template associated with the first end user, and where the biometric template is comprised in the active biometric template database that has been stored on the second mobile computing device.

The computer-implemented method further includes authenticating, based in part on a second interaction with the second mobile computing device, the first end user, where the second interaction with the second mobile computing device comprises receiving the PIN associated with the biometric template associated with the first end user via the second mobile computing device and verifying the PIN based in part on data associated with the active PIN database that has been stored on the second mobile computing device.

The computer-implemented method further includes causing at least one of encryption or decryption of one or more biometric templates based in part on a symmetric shared secret.

The computer-implemented method further includes where the symmetric shared secret is generated by a secrets management system associated with the MBTA system, and where the secrets management system is configured to distribute the symmetric shared secret to each respective mobile computing device of the plurality of mobile computing devices.

The computer-implemented method further includes where the symmetric shared secret is imported into a biometric trusted application comprised within a trusted execution environment (TEE) of each respective mobile computing device of the plurality of mobile computing devices, and where the symmetric shared secret is associated with a hash-based message authentication code associated with each respective mobile computing device of the plurality of mobile computing devices.

The computer-implemented method further includes notifying, via an MQTT broker associated with the MBTA system, the plurality of mobile computing devices that at least one of the active biometric template database or the active PIN database have been updated. The computer-implemented method also includes causing the plurality of mobile computing devices to obtain current data related to the at least one of the active biometric template database or the active PIN database.

The computer-implemented method further includes removing at least one of one or more biometric templates or one or more PINs from the active biometric template database or the active PIN database respectively, where removing the at least one of the one or more biometric templates or the one or more PINs comprises notifying, via the MQTT broker associated with the MBTA system, the plurality of mobile computing devices that the at least one of the one or more biometric templates or the one or more PINs have been removed, and causing the plurality of mobile computing devices to obtain the current data related to the at least one of the active biometric template database or the active PIN database.

The computer-implemented method further includes remotely enabling or disabling an MBTA authentication mode on at least one of the first mobile computing device or the plurality of mobile computing devices.

The computer-implemented method further includes where the MBTA data further comprises one or more extensible markup language (XML) configuration documents, and where the first mobile computing device and the plurality of mobile computing devices are configured in part by executing one or more commands associated with the one or more XML configuration documents.

The computer-implemented method further includes where the one or more XML configuration documents are transmitted to the first mobile computing device and the plurality of mobile computing devices by a mobile device management tool associated with the MBTA system.

The computer-implemented method further includes where the first mobile computing device and the plurality of mobile computing devices are configured to scan, via an optical engine, one or more barcodes associated with the one or more respective XML configuration documents, where scanning the one or more barcodes causes the first mobile computing device and the plurality of mobile computing devices to execute the one or more commands associated with the one or more respective XML configuration documents.

The computer-implemented method further includes authenticating, based in part on a first interaction with a third mobile computing device of the plurality of mobile computing devices, a second end user, where the first interaction with the third mobile computing device comprises collecting biometric data associated with the second end user via the third mobile computing device and utilizing a biometric data matching algorithm to match the biometric data associated with the second end user to a biometric template associated with the second end user, where the biometric template associated with the second end user was generated in response to receiving, by the MBTA system, a request to generate the biometric template associated with the second end user from a fourth mobile computing device, and where the biometric template associated with the second end user is comprised in the active biometric template database that has been stored on the third mobile computing device.

The computer-implemented method further includes authenticating, based in part on a second interaction with the third mobile computing device, the second end user, where the second interaction with the third mobile computing device comprises receiving a PIN associated with the biometric template associated with the second end user via the third mobile computing device and verifying the PIN based in part on data associated with the active PIN database that has been stored on the third mobile computing device.

In accordance with a second aspect of the disclosure, a system for providing secure MBTA is provided. In one example embodiment, the system comprises one or more processors, a non-transitory memory, and one or more programs stored in the non-transitory memory. The one or more programs comprise instructions configured to perform any one of the example computer-implemented methods described herein.

In accordance with a third aspect of the disclosure, a computer program product for providing secure MBTA. In one example embodiment, the computer program product includes at least one non-transitory computer-readable storage medium having computer program code instructions stored thereon that, in execution with at least one processor, configures the computer program product for performing any one of the example computer-implemented methods described herein.

BRIEF DESCRIPTIONS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

Figure 10B:
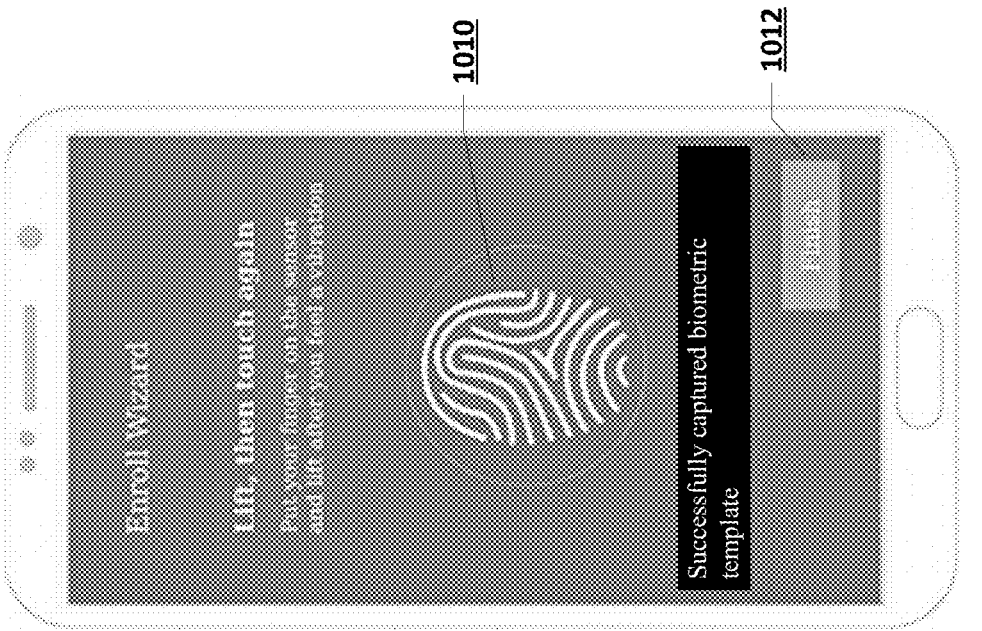
Figure 10A:
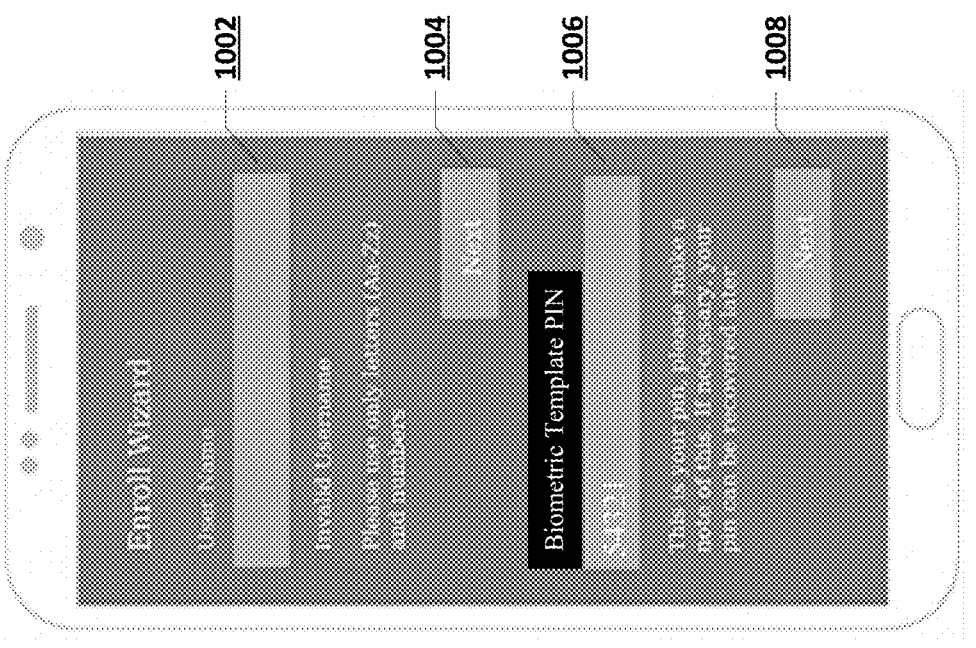
Figure 11B:
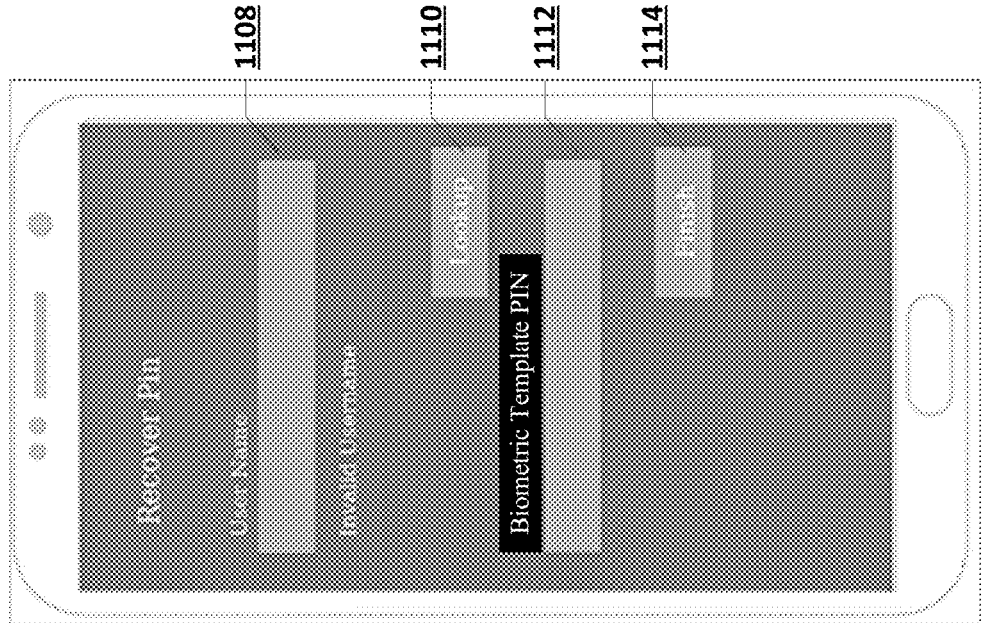
Figure 11A:
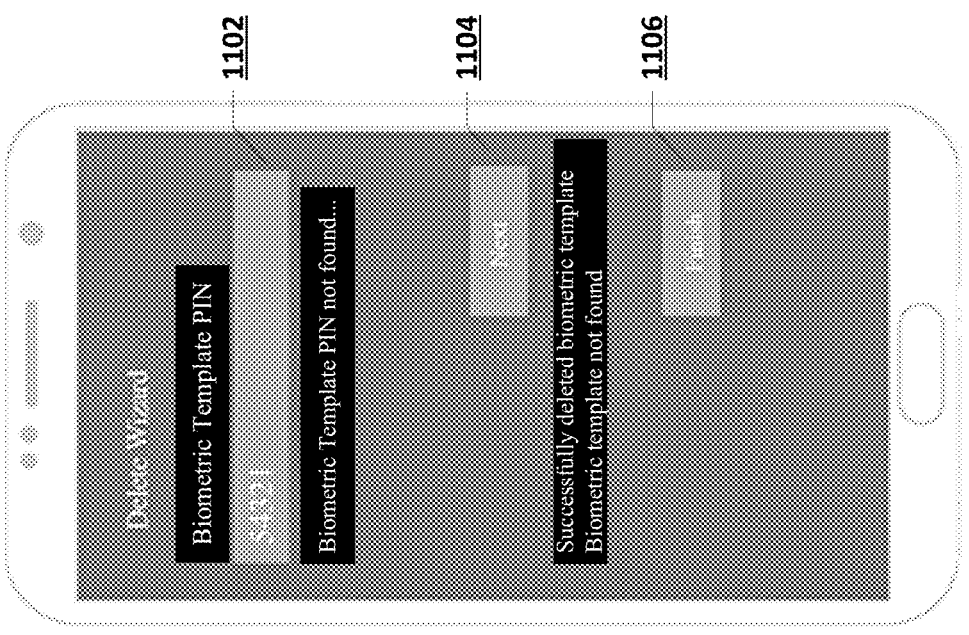

FIGS. 10A-B illustrate an exemplary user interface of a BT management application rendered on a mobile computing device associated with an MBTA system, in accordance with one or more embodiments described herein;

FIGS. 11A-B illustrate another exemplary user interface of a BT management application rendered on a mobile computing device associated with an MBTA system, in accordance with one or more embodiments described herein; and FIG. 12 illustrates a process flow diagram for methods related to secure MBTA, in accordance with one or more embodiments described herein.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

Overview

As described herein, a particular enterprise may deploy tens or hundreds of mobile computing devices to be used by a workforce associated with the particular enterprise and, in many contexts, the mobile computing devices may not be directly assigned to respective members of the workforce. As such, various members of the workforce may interact with the same mobile computing device. To ensure the digital security of the data related to the enterprise, the enterprise may employ biometric authentication on the mobile computing devices in order to verify the identity of a particular member of the workforce before the mobile computing devices can be accessed and utilized. However, there are inherent problems associated with the traditional means of biometrically authenticating members of a large workforce on a large plurality of mobile computing devices associated with the particular enterprise.

An initial incumbrance presented by traditional biometric authentication systems and protocols is that the biometric authentication of a particular end user must occur on a particular mobile computing device that is associated with the particular end user. Oftentimes, due to strict device access parameters embedded by the vendor and/or manufacturer of the particular mobile computing device, a biometric template (BT) (e.g., a digital representation of a fingerprint associated with a particular end user) must be locally stored on the particular mobile computing device. Furthermore, many modern mobile computing devices only allow a small number of BTs to be stored locally and/or associated with the mobile computing device, greatly limiting the number of end users who can access the mobile computing device.

These issues are vastly compounded when addressed at an enterprise scale. For instance, if an enterprise employs a large workforce comprising tens or hundreds of employees that must share a discrete number of mobile computing devices to accomplish work-related tasks, a system for biometrically authenticating the members of the workforce across all of the mobile computing devices is desirable. Alternatively, an enterprise may have multiple work environments that members of the workforce must roam between and access respective mobile computing devices situated across the multiple work environments.

Furthermore, it is increasingly imperative that enterprises satisfy the privacy requirements of the General Data Protection Regulation (GDPR) in Europe and/or the California Consumer Privacy Act (CCPA), as well as any new privacy regulations as regulations emerge, that are created to give end users power over their personal information (e.g., biometric data associated with the end users). A security scheme is essential to preserve the privacy of personal identifiable information (PII) such as BTs. Security schemes such as symmetric and asymmetric encryption, while obvious solutions, complicate the enrollment and verification processes. As the use of biometrics has evolved, ISO standards for template protection schemes (e.g., ISO 24745) and the evaluation of template protection schemes (e.g., ISO 30136) have emerged.

The main criteria for template projection schemes are irreversibility, unlinkability, and confidentiality. The irreversibility criterion requires that, for a fixed pre-defined usage (such as recognition), the raw biometric data must be transformed into an irreversible representation that precisely fits the task of the pre-defined usage. The unlinkability criterion requires that there must be no relationship between the stored biometric templates neither across applications nor databases. The confidentiality criterion requires that the biometric template must be preserved and not exposed to unauthorized parties trying to gain unauthorized access. Fulfilling this set of criteria is now necessary to comply with the privacy principles of the GDPR, CCPA, and emerging privacy protecting regulations.

Thus, to address these and/or other issues, various embodiments of the present disclosure relate to computer-implemented methods, systems, and computer-program products directed to biometric data aggregation and secure multi-user biometric template authentication (MBTA) across a plurality of mobile computing devices associated with a particular enterprise. Various embodiments provide an MBTA system configured to provision a plurality of mobile computing devices; generate, update, and/or remove one or more BTs associated with one or more respective end users; and dynamically configure the plurality of mobile computing devices to securely authenticate one or more end users associated with an enterprise workforce based on biometric data related to the one or more end users. Various embodiments also provide, by way of the MBTA system, means to securely encrypt, decrypt, store, and/or transmit one or more portions of MBTA data (e.g., BT data, user authentication data, system configuration data, and/or the like).

In various contexts, a BT can be understood as a digital representation of one or more portions of biometric data associated with a particular end user. For example, when raw biometric data associated with a particular end user is captured (e.g., via biometric hardware associated with a particular mobile computing device), various minutia points related to the raw biometric data can be identified, mapped, and/or converted into a computer-readable format. For example, various minutia points associated with the configuration of a fingerprint or facial features related to an end user can be captured and the minutia points can be mapped. The minutia points and/or minutia point map can be converted into a computer-readable format known as a biometric template (e.g., such as in, for example, a data file comprising a combination of bits that represent the minutia points and/or minutia point map). Advantageously, as will be described herein, the BT can be encrypted such that the biometric data associated with the end user is protected.

As such, because the BT associated with the end user represents unique biometric data related to the end user, the BT can be used for various authentication operations related to identifying the end user on a mobile computing device. Non-limiting example of biometric data associated with an end user comprise, but are not limited to, fingerprint data, palm data, vein data, retina and/or iris data, voice data, facial feature data (e.g., face shape, eye shape, nose shape, etc.), body feature data (e.g., car shape), DNA data, handwriting data, and/or any other physical and/or personal data related to a particular end user.

Embodiments of the present disclosure can be configured to enroll one or more end users into the MBTA system. The enrollment process, as will described herein, comprises collecting the biometric data associated with a particular end user, generating a BT based on the biometric data, generating a unique PIN for the end user that is associated with the BT, and/or maintaining a storage system related to the MBTA system that manages a list of active BTs and PINS associated with the one or more end users enrolled into the MBTA system. One or more lists (e.g., an active BT list and/or an active PIN list associated with the BTs and/or PINs of one or more enrolled end users respectively) can be transmitted and stored on one or more mobile computing devices associated with the MBTA system. Furthermore, whenever a change is made to the one or more active BT and/or PIN lists, the MBTA system can automatically publish one or more notifications to the one or more mobile computing devices such that each respective mobile computing device of the one or more mobile computing devices contains a local copy of the most current active BT and/or PIN lists. In this regard, embodiments of the present disclosure provide the means to use the biometric data, the BTs, and/or the PINs associated to the BTs related to one or more respective end users to verify and/or authenticate (e.g., via one or more biometric data matching algorithms) the one or more end users on the one or more respective mobile computing devices associated with the MBTA system.

As such, by employing one or more techniques disclosed herein, various technical improvements can be achieved. For example, employing the one or more techniques disclosed herein can provide secure MBTA for a large plurality of mobile computing devices associated with a particular enterprise. Furthermore, employing the one or more techniques disclosed herein can provide a means to alleviate strict device access parameters embedded into the plurality of mobile computing devices by the vendor and/or manufacture of the plurality of mobile computing devices by, for example, overcoming device access parameters that limit the number of BTs that can be associated with a particular device. Additionally, computational resources, as well as business resources, associated with the enterprise utilizing the proposed MBTA system are reduced as the end users associated with the enterprise need only to enroll into the MBTA system via a first mobile computing device a single time in order to gain access to a large plurality of other mobile computing devices associated with the enterprise.

For example, according to various embodiments, an end user can enroll into the MBTA system on a first device at a first business location associated with the enterprise and would be automatically able to be biometrically authenticated on a second mobile computing device located at a second business location associated with the enterprise.

Exemplary Systems and Apparatuses of the Present Disclosure

Figure 1:
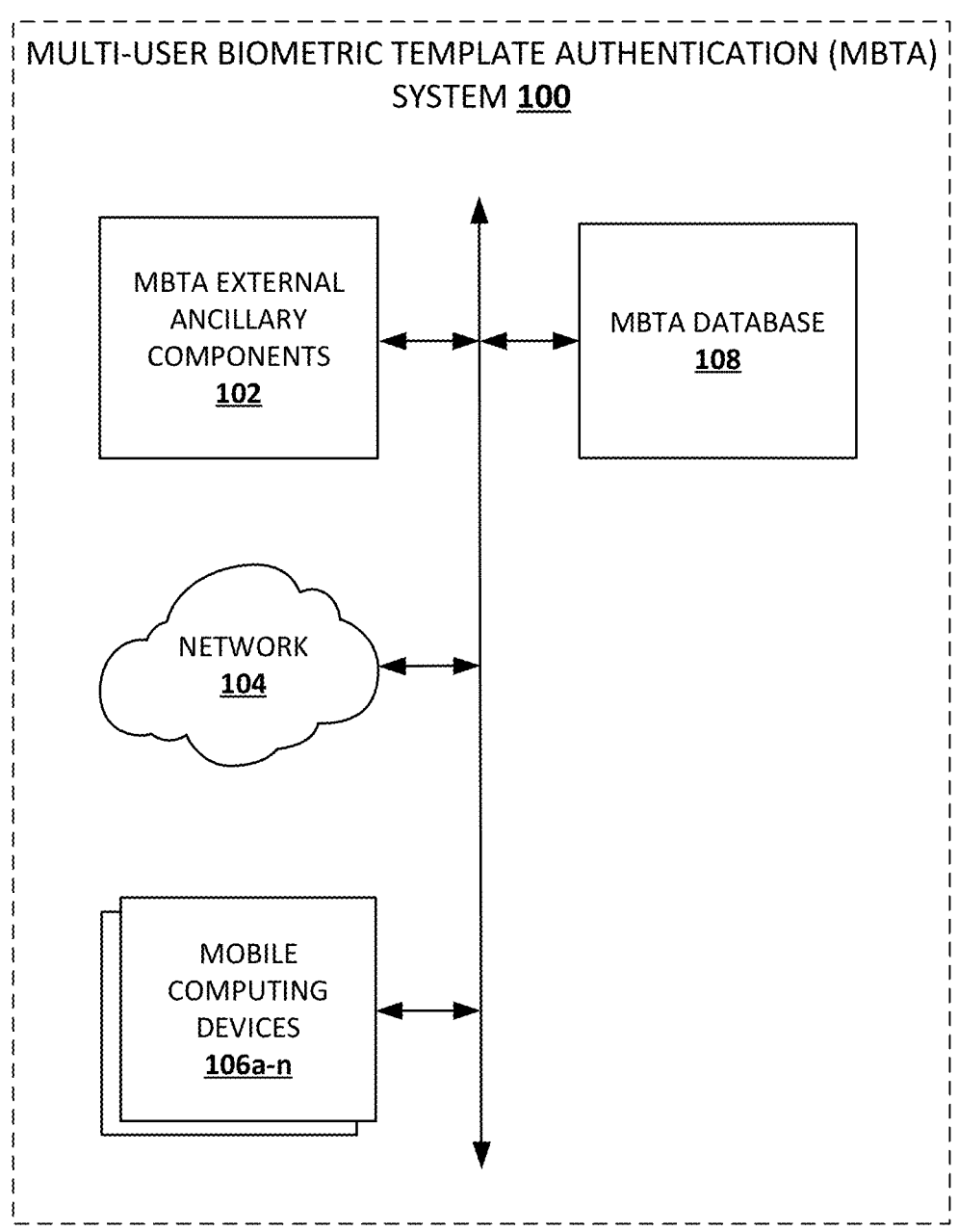
FIG. 1 illustrates an exemplary multi-user biometric template authentication (MBTA) system configured for secure MBTA, in accordance with one or more embodiments described herein.

FIG. 1 illustrates an exemplary multi-user biometric template authentication (MBTA) system 100 configured for secure MBTA according to one or more described features of one or more embodiments of the disclosure. According to various embodiments, the MBTA system 100 includes one or more MBTA external ancillary components 102, a network 104, one or more mobile computing devices 106a-n, and/or an MBTA database 108. The MBTA system 100 is associated with one or more application products such as an multi-user authentication platform, a biometric data platform, a data security platform, an asset management platform, an asset performance platform, a global operations platform, a site operations platform, an industrial asset platform, an industrial process platform, a digital worker platform, an energy and sustainability platform, a healthy buildings platform, an energy optimization platform, a predictive maintenance platform, a centralized control platform, and/or another type of asset platform.

In an embodiment, the MBTA system 100 works in conjunction with one or more server systems (e.g., a server device such as MBTA database 108), one or more data sources, and/or one or more assets associated with an enterprise. In one or more embodiments, the MBTA system 100 comprises one or more processors and a memory. In various embodiments, the MBTA system 100 is also related to one or more technologies, such as, for example, enterprise technologies, industrial technologies, connected building technologies, Internet of Things (IoT) technologies, user interface technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, cybersecurity technologies, navigation technologies, asset visualization technologies, oil and gas technologies, petrochemical technologies, refinery technologies, process plant technologies, procurement technologies, and/or one or more other technologies.

Moreover, the MBTA system 100 provides an improvement to one or more technologies such as enterprise technologies, industrial technologies, connected building technologies, IoT technologies, user interface technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, cybersecurity technologies, navigation technologies, asset visualization technologies, oil and gas technologies, petrochemical technologies, refinery technologies, process plant technologies, procurement technologies, and/or one or more other technologies. In an implementation, the MBTA system 100 improves performance of a user computing device. For example, in one or more embodiments, the MBTA system 100 improves processing efficiency of a mobile computing device, reduces power consumption of a computing device, improves quality of data provided by a user computing device, etc. In various embodiments, the MBTA system 100 improves performance of a user computing device by optimizing biometric data associated with one or more end users, by reducing a number of user interactions with respect to an interactive user interface (e.g., associated with the one or more mobile computing devices 106a-n), and/or by reducing a number of computing resources required to render content via an interactive user interface.

In one or more embodiments, the MBTA system 100 aggregates biometric data associated with one or more end users (e.g., a workforce associated with a particular enterprise) and can facilitate secure MBTA for the one or more end users across a plurality of computing devices (e.g., mobile computing devices 106a-n). In various embodiments, to facilitate the secure MBTA, the MBTA system 100 can generate, distribute, and cause the integration of a biometric template management application to the one or more mobile computing devices 160a-n. The biometric template management application can facilitate one or more procedures associated with the MBTA system 100 on the one or more mobile computing devices 106a-n. For example, the biometric template management application can facilitate the execution one or more procedures related to MBTA such as transmitting, from a particular mobile computing device 106a, a request (e.g., a request to generate a biometric template (BT)), receiving and/or processing MBTA data, enrolling an end user into the MBTA system 100 (e.g., collecting biometric data from the end user, assigning a PIN to the end user, and/or the like), causing the updating of an active BT database, an active PIN database, and/or any data stores (e.g., server systems, cloud-based databases, etc.) associated with the MBTA system 100, causing the configuration of the particular mobile computing device 106a, and/or facilitate any other process associated with the MBTA system 100 as it relates to the particular mobile computing device 106a.

In one or more embodiments, the one or more components of the MBTA system 100 are in communication via the network 104. In various embodiments, network 104 is any suitable network or combination of networks and supports any appropriate protocol suitable for communication of data to and from components of the MBTA system 100. According to various embodiments, network 104 includes a public network (e.g., the Internet), a private network (e.g., a network within an organization), or a combination of public and/or private networks. According to various embodiments, network 104 comprises one or more networks that connect devices and/or components in the network layout to allow communication between the devices and/or components. For example, in one or more embodiments, the network 104 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 104 is implemented using cellular networks, satellite, licensed radio, or a combination of cellular, satellite, licensed radio, and/or unlicensed radio networks.

In various embodiments, the one or more mobile computing devices 106a-n are integrated within or correspond to a barcode scanner, a smartphone, a tablet computer, a mobile computer, a desktop computer, a laptop computer, a workstation computer, a wearable device, a virtual reality device, an augmented reality device, or another type of computing device associated with the MBTA system 100. The one or more mobile computing devices 106a-n can generate a request and transmit the request to one or more components of the MBTA system 100 (e.g., one or more of the MBTA external ancillary components 102) via the network 104. In various embodiments, the MBTA system 100 transmits the MBTA data to one or more mobile computing devices 106a-n via the network 104.

The MBTA system 100 also includes an MBTA database 108. In various embodiments, the MBTA database 108 can embody, integrate with, or be embodied by one or more server systems associated with the MBTA system 100. For example, the MBTA database can be integrated with a secrets management system, an FTP server, and/or an MQTT broker associated with the MBTA system 100. The MBTA database 108 can be configured to store, update, delete, and/or otherwise manage one or more portions of data related to the MBTA system 100. For example, in various embodiments, the MBTA database 108 can manage and/or integrate with one or more active BT lists and/or one or more PIN lists associated with the MBTA system 100. The MBTA database 108 is also configured to manage one or more portions of data related to one or more requests 216 and/or one or more portions of MBTA data 112. In various embodiments the MBTA database 108 can be configured as a cloud-based storage system capable of communicating with the various components of the MBTA system 100 via the network 104.

Figure 2:
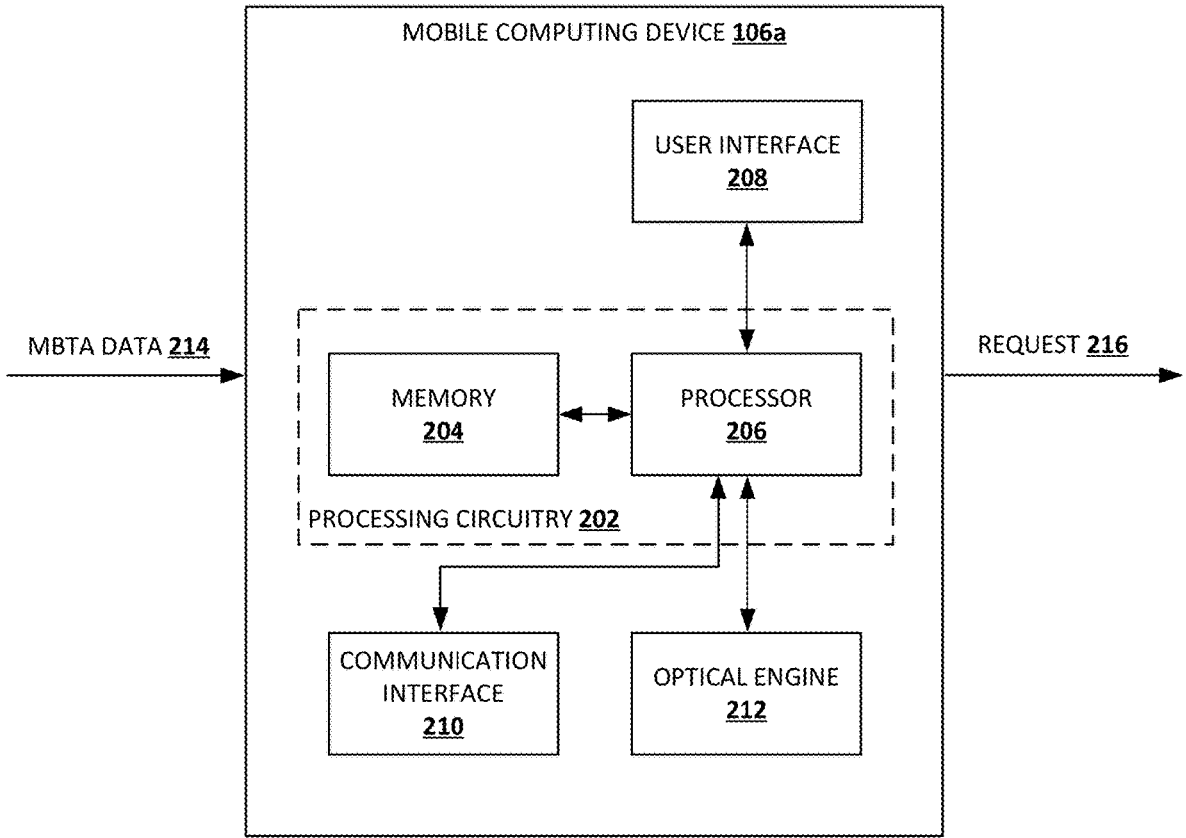
FIG. 2 illustrates a schematic block diagram of an exemplary mobile computing device to be used in accordance with one or more embodiments described herein.

FIG. 2 illustrates a schematic block diagram of an exemplary mobile computing device 106a to be used in accordance with one or more embodiments described herein. As described herein, in various embodiments, the mobile computing device 106a can be embodied as one or more computing devices such as a scanner (e.g., a barcode scanner, etc.), a smartphone, a tablet computer, a wearable device, a handheld computing device, an augmented reality device, a virtual reality device, a sensor device, or another type of mobile computing device. In certain embodiments, the mobile computing device 106a can be a scan engine device (e.g., a two-dimensional scan engine device or a three-dimensional scan engine device). However, it should be noted that the components, devices, or elements illustrated in and described with respect to FIG. 2 below may not be mandatory and thus one or more may be omitted in certain embodiments. Additionally, some embodiments may include further or different components, devices, or elements beyond those illustrated in and described with respect to FIG. 2. The mobile computing device 106a can generate a request 216 and transmit the request 216 to one or more components of the MBTA system 100 (e.g., one or more of the MBTA external ancillary components 102) via the network 104. In various embodiments, the MBTA system 100 transmits the MBTA data 214214 to one or more mobile computing devices 106a-n via the network 104.

In one or more embodiments, the request 216 is a request to enroll a particular end user into the MBTA system 100, wherein enrolling the particular end user comprises generating a BT associated with a particular end user, generating and/or associating a PIN to the BT associated with the particular end user, and/or storing the BT and the PIN in an active BT database and an active PIN database respectively. In this regard, in some embodiments, the request 216 can be a request to update one or more data stores and/or computing devices (e.g., server systems, cloud-based storage systems, databases, interactive tables, etc.) associated with the MBTA system 100. As such, the request 216 may be a request to add, delete, augment, and/or otherwise manage biometric data, identification data, and/or user authentication data associated with a particular end user associated with the MBTA system 100. Additionally or alternatively, in some embodiments, the request 216 can be a request to configure and/or reconfigure the one or more mobile computing devices 106*a-n* to facilitate MBTA on the one or more mobile computing devices 106*a-n*. A request 216 can comprise identification data related to one or more end users (e.g., person identifiable information (PII)), the mobile computing device 106*a* that generated the request 216 (e.g., a device serial number, MAC address, IP address, and/or the like), and/or any other identification data related to the enterprise associated with the MBTA system 100.

In various embodiments, the MBTA data 214 generated by the one or more components of the MBTA system 100 comprises one or more portions of BT data (e.g., biometric data associated with one or more end users, one or more active BTs, and/or the like), one or more portions of user authentication data (e.g., active PIN data associated an active BT related to a respective end user, password data, user login data, and/or the like), and/or one or more portions of system configuration data (e.g., one or more XML configuration documents, symmetric shared secrets, encryption/decryption data, data related to one or more public/private key pairs, data related to one or more active BT lists and/or active PIN lists, and/or the like). In one or more embodiments, the MBTA system 100 can configure the MBTA data 214 based on one or more portions of BT data, user authentication data, and/or system configuration data.

In various embodiments, biometric data associated with a particular end user can comprise, but is not limited to, fingerprint data, palm data, vein data, retina and/or iris data, voice data, facial feature data (e.g., face shape, eye shape, nose shape, etc.), body feature data (e.g., car shape), DNA data, handwriting data, and/or any other physical and/or personal data related to a particular end user. In various embodiments, the MBTA system 100 is configured to generate one or more BTs associated with the biometric data associated with a particular end user. Additionally or alternatively, in various embodiments, the MBTA data 214 comprises identification data related to one or more end users (e.g., PII), one or more mobile computing devices 106*a-n* (e.g., a device serial number, MAC address, IP address, and/or the like), and/or any other applicable identification data related to the enterprise associated with the MBTA system 100.

In another example, in one or more embodiments, the MBTA data 214 includes one or more notifications associated with the MBTA data 214. In some embodiments, a message queuing telemetry transport (MQTT) broker associated with the MBTA system 100 can generate the one or more notifications associated with the MBTA data 214. Based on the notifications received by the MBTA system 100 (e.g., by way of the MQTT broker), the one or more mobile computing devices 106*a-n* can be directed to execute various actions related to the method described herein. As a non-limiting example, based on a notification generated and/or transmitted by the MQTT broker, one or more mobile computing device 106*a-n* can download and/or otherwise obtain one or more of an active BT list and/or active PIN list associated with the MBTA system 100, where the active BT list and/or active PIN list respectively comprise data related to one or more BTs and/or PINs associated with one or more end users that are currently enrolled in the MBTA system 100. As another non-limiting example, a notification generated and/or transmitted by the MQTT broker may comprise and/or be associated with an XML configuration document such that, when received by the one or more mobile computing devices 106*a-n*, the one or more mobile computing devices 106*a-n* are directed to configure (or reconfigure) one or more hardware and/or software settings, parameters, operational modes, user access levels, applications, and/or the like associated with the one or more mobile computing devices 106*a-n*.

In one or more embodiments, the MBTA data 214 also includes one or more visual elements for the visual display (e.g., as rendered by a user interface component) of the one or more mobile computing devices 106*a-n* that renders an interactive user interface based on a respective user interface configuration. For example, the MBTA system 100, via the biometric template management application, can cause a rendering of visualization data associated with one or more processes and/or methods associated with the MBTA system 100 to be presented via a respective electronic interface of one or more mobile computing devices 106*a-n*. In various embodiments, the rendering can be caused via one or more computer-executable instructions included in the MBTA data 214. In certain embodiments, the visual display of the one or more mobile computing devices 106*a-n* displays one or more graphical elements associated with the MBTA data 214. In certain embodiments, the electronic interface component of the one or more mobile computing devices 106*a-n* renders one or more interactive display elements associated with the MBTA data 214. In certain embodiments, the MBTA system 100 can configure the electronic interface to render one or more interactive display elements associated with the biometric template management application.

The mobile computing device 106*a* may include or otherwise be in communication with processing circuitry 202 that is configurable to perform actions in accordance with one or more embodiments disclosed herein. In this regard, the processing circuitry 202 may be configured to perform and/or control performance of one or more functionalities of the mobile computing device 106*a* in accordance with various embodiments, and thus may provide means for performing functionalities of the mobile computing device 106*a* in accordance with various embodiments. The processing circuitry 202 may be configured to perform data processing, application execution and/or other processing and management services according to one or more embodiments. In some embodiments, the mobile computing device 106*a* or a portion(s) or component(s) thereof, such as the processing circuitry 202, may be embodied as or comprise a chip or chip set. In other words, the mobile computing device 106*a* or the processing circuitry 202 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The mobile computing device 106*a* or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 202 may include a processor 206 and, in some embodiments, such as that illustrated in FIG. 2, may further include memory 204.

The processing circuitry 202 may be in communication with or otherwise control a user interface 208 and/or a communication interface 210. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the mobile computing device 106a as described herein. In some embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein.

In some embodiments, the memory 204 may include one or more non-transitory memory devices such as, for example, volatile and/or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions and/or the like for enabling the mobile computing device 106a to carry out various functions in accordance with one or more embodiments. For example, the memory 204 may be configured to buffer input data for processing by the processor 206. Additionally or alternatively, the memory 204 may be configured to store instructions for execution by the processor 206. As yet another alternative, the memory 204 may include one or more databases that may store a variety of files, contents or data sets. Among the contents of the memory 204, applications may be stored for execution by the processor 206 in order to carry out the functionality associated with each respective application. In some cases, the memory 204 may be in communication with one or more of the processor 206, user interface 208, and/or communication interface 210 via a bus(es) for passing information among components of the mobile computing device 106a.

The user interface 208 may be in communication with the processing circuitry 202 to receive an indication of a user input at the user interface 208 and/or to provide an audible, visual, mechanical, or other output to the user. As such, the user interface 208 may include, for example, biometric hardware (e.g., a biometric sensor, biometric reader, fingerprint scanner, retina scanner, and/or the like), a keyboard, a mouse, a joystick, an electronic display, a touchscreen display, a microphone, a speaker, and/or other input/output mechanisms. As such, the user interface 208 may, in some embodiments, provide means for a user to access and interact with the mobile computing device 106a and/or other devices.

The communication interface 210 may include one or more interface mechanisms for enabling communication with other devices and/or networks. In some cases, the communication interface 210 may be any means such as a device or circuitry embodied in either hardware, or a combination of hardware and software that is configured to receive and/or transmit data from/to a network and/or any other device or module in communication with the processing circuitry 202. By way of example, the communication interface 210 may be configured to enable the mobile computing device 106a to communicate with the various components of the MBTA system 100 (e.g., the MBTA external ancillary components 102). For example, in various embodiments, the mobile computing device 106a can receive, via the communication interface 210, the MBTA data 214 from one or more of the MBTA external ancillary components 102. Similarly, in various embodiments, the mobile computing device 106a can transmit, via the communication interface 210, one or more requests 216 to the one or more of the MBTA external ancillary components 102 associated with the MBTA system 100. Accordingly, the communication interface 210 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

In one or more embodiments, the mobile computing device 106a includes an optical engine 212. The optical engine 212 can include an imager, a laser aimer, and/or a secondary processing device. The imager can be configured to obtain two or more frames (e.g., two or more image frames) associated with an object within a field of view of the imager. In one or more embodiments, the imager and/or the laser aimer can be configured as portions of the optical engine 212 that includes light-generating devices, mirroring elements, electronic components, control components, and/or other components configured to obtain images within the field of view. In various embodiments, the secondary processing device of the optical engine 212 can be configured with less processing power and/or a smaller physical size as compared to the processor 206 of the mobile computing device 106a. For example, the processor 206 of the mobile computing device 106a can be configured for image processing related to frames captured by the imager. Additionally, the secondary processing device of the optical engine 212 can be configured for one or more calculations associated with the imager and/or the laser aimer that require less processing power than the image processing performed by the processor 206 of the mobile computing device 106a.

Figure 3:
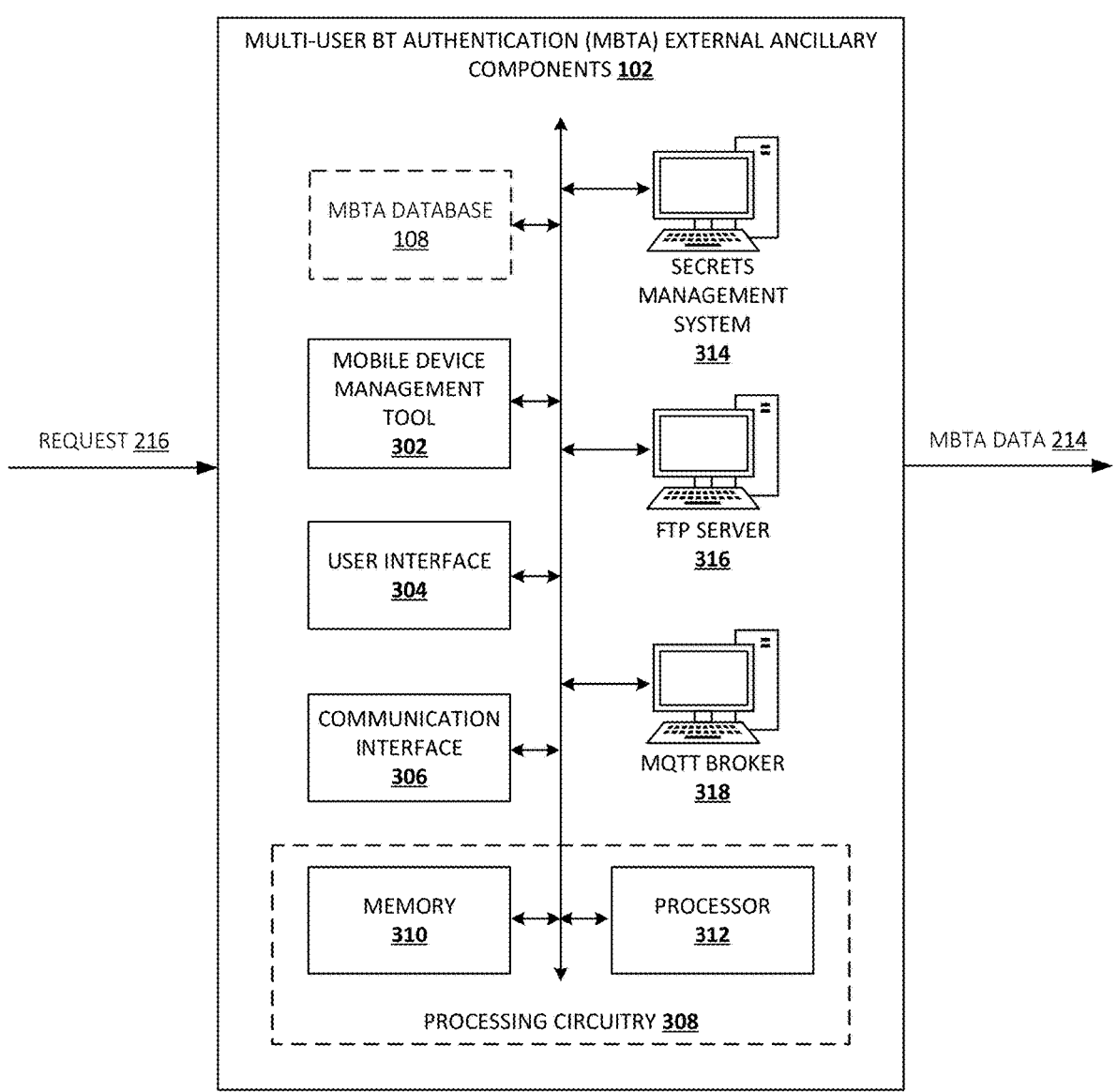
FIG. 3 illustrates a schematic block diagram of MBTA external ancillary components associated with an exemplary MBTA system, in accordance with one or more embodiments described herein.

FIG. 3 a schematic block diagram of MBTA external ancillary components 102 associated with an exemplary MBTA system 100, in accordance with one or more embodiments described herein. In various embodiments, the MBTA system 100, in conjunction with the MBTA external ancillary components 102, provides a practical application of biometric data analytics technology and/or digital transformation technology to facilitate secure MBTA for a one or more mobile computing devices 106a-n associated with a particular enterprise. In one or more embodiments, the MBTA system 100, by way of the MBTA external ancillary components 102, provides a practical application of receiving requests to generate biometric templates and PINs associated with one or more end users and transmitting biometric template data and/or system configuration data (e.g., MBTA data 214) associated with one or more active end users associated with the MBTA system 100 to the one or more mobile computing devices 106a-n.

The MBTA external ancillary components 102 include, embody, and/or integrate with the MBTA database 108, a mobile device management tool 302, a user interface 304, a communication interface 306, processing circuitry 308 that comprises a memory 310 and/or a processor 312, a secrets management system 314, an FTP server 316, and/or an MQTT broker 318. In certain embodiments, one or more aspects of the MBTA external ancillary components 102 (and/or other systems, apparatuses and/or processes disclosed herein) constitute executable instructions embodied within a computer-readable storage medium (e.g., the memory 310). For instance, in an embodiment, the memory 310 stores computer executable component and/or executable instructions (e.g., program instructions). Additionally, in various embodiments, the mobile device management tool 302, the processing circuitry 308, the secrets management system 314, the FTP server 316, and/or the MQTT broker 318 embody executable computer program code and/or interface with one or more computer programs and/or computer hardware configured to employ secure MBTA conventions for one or more mobile computing devices 106a-n. In various embodiments, the processor 312 facilitates execution of the computer executable components and/or the executable instructions (e.g., the program instructions). In an example embodiment, the processor 312 is configured to execute instructions stored in the memory 310 or otherwise accessible to the processor 312. However, it should be noted that the components, devices, or elements illustrated in and described with respect to FIG. 3 below may not be mandatory and thus one or more may be omitted in certain embodiments. Additionally, some embodiments may include further or different components, devices, or elements beyond those illustrated in and described with respect to FIG. 3.

The MBTA external ancillary components 102 may include or otherwise be in communication with processing circuitry 308 that is configurable to perform actions in accordance with one or more embodiments disclosed herein. In this regard, the processing circuitry 308 may be configured to perform and/or control performance of one or more functionalities of the MBTA external ancillary components 102 in accordance with various embodiments, and thus may provide means for performing functionalities of the MBTA system 100 in accordance with various embodiments. The processing circuitry 308 may be configured to perform data processing, application execution and/or other processing and management services according to one or more embodiments. In some embodiments, the MBTA external ancillary components 102 or a portion(s) or component(s) thereof, such as the processing circuitry 308, may be embodied as or comprise a chip or chip set. In other words, the MBTA external ancillary components 102 or the processing circuitry 308 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The MBTA external ancillary components 102 or the processing circuitry 308 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 308 may include a processor 312 and, in some embodiments, such as that illustrated in FIG. 3, may further include memory 310. The processing circuitry 308 may be in communication with or otherwise control a user interface 304 and/or a communication interface 306. As such, the processing circuitry 308 may be embodied as a circuit chip (e.g., an integrated circuit chip) configured (e.g., with hardware, software or a combination of hardware and software) to perform operations described herein.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 312 may comprise a plurality of processors. The plurality of processors may be in operative communication with each other and may be collectively configured to perform one or more functionalities of the MBTA external ancillary components 102 as described herein. In some embodiments, the processor 312 may be configured to execute instructions stored in the memory 310 or otherwise accessible to the processor 312. As such, whether configured by hardware or by a combination of hardware and software, the processor 312 may represent an entity (e.g., physically embodied in circuitry—in the form of processing circuitry 308) capable of performing operations according to embodiments of the present disclosure while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform one or more operations described herein.

In some embodiments, the memory 310 may include one or more non-transitory memory devices such as, for example, volatile and/or non-volatile memory that may be either fixed or removable. In this regard, the memory 310 may comprise a non-transitory computer-readable storage medium. It will be appreciated that while the memory 310 is illustrated as a single memory, the memory 310 may comprise a plurality of memories. The memory 310 may be configured to store information, data, applications, instructions and/or the like for enabling the mobile computing device 106a to carry out various functions in accordance with one or more embodiments. For example, the memory 310 may be configured to buffer input data for processing by the processor 312. Additionally or alternatively, the memory 310 may be configured to store instructions for execution by the processor 312. As yet another alternative, the memory 310 may include one or more databases that may store a variety of files, contents, or data sets. Among the contents of the memory 310, applications may be stored for execution by the processor 312 in order to carry out the functionality associated with each respective application. In some cases, the memory 310 may be in communication with one or more of the processor 312, user interface 304, and/or communication interface 306 via a bus(es) for passing information among components of the mobile computing device 106a.

The user interface 304 may be in communication with the processing circuitry 308 to receive an indication of a user input at the user interface 304 and/or to provide an audible, visual, mechanical, or other output to the user. As such, the user interface 304 may include, for example, biometric hardware, a keyboard, a mouse, a joystick, an electronic display, a touchscreen display, a microphone, a speaker, and/or other input/output mechanisms. As such, the user interface 304 may, in some embodiments, provide means for a user to access and interact with the various MBTA external ancillary components 102 of the MBTA system 100 and/or other systems and devices.

In one or more embodiments, the communication interface 306 is configured to receive a request 216 (e.g., such as from one or more mobile computing devices 106a-n). In various embodiments, the communication interface 306 can relay the request 216 to one or more of the mobile device management tool 302, the processing circuitry 308, the secrets management system 314, the FTP server 316, and/or the MQTT broker 318 for processing and/or compiling MBTA data 214. Once the MBTA data 214 has been compiled (e.g., as by the mobile device management tool 302, the processing circuitry 308, the secrets management system 314, the FTP server 316, and/or the MQTT broker 318), the communication interface 306 can transmit the MBTA data 214 to one or more mobile computing devices 106a-n.

The communication interface 306 may include one or more interface mechanisms for enabling communication with other devices and/or networks. In some cases, the communication interface 306 may be any means such as a device or circuitry embodied in either hardware, or a combination of hardware and software that is configured to receive and/or transmit data from/to a network and/or any other device or module in communication with the processing circuitry 308. By way of example, the communication interface 306 may be configured to enable the mobile computing device 106a to communicate with one or more mobile computing devices 106a-n. For instance, in various embodiments, the MBTA external ancillary components 102 can receive, via the communication interface 306, a request 216 from the one or more mobile computing devices 106a-n. Similarly, in various embodiments, the MBTA external ancillary components 102 can transmit, via the communication interface 306, one or more portions of MBTA data 214 to the one or more mobile computing devices 106a-n. Accordingly, the communication interface 306 may, for example, include an antenna (or multiple antennas) and supporting hardware and/or software for enabling communications with a wireless communication network (e.g., a wireless local area network, cellular network, global positioning system network, and/or the like) and/or a communication modem or other hardware/software for supporting communication via cable, digital subscriber line (DSL), universal serial bus (USB), Ethernet or other methods.

The mobile device management tool 302 can configure, reconfigure, update, restore, install applications, and/or otherwise manage the one or more mobile computing devices 106a-n. In various embodiments, the mobile device management tool 302 can distribute a biometric template management application to the one or more mobile computing devices 106a-n and cause the installation of the biometric template management application to the one or more mobile computing devices 106a-n. The mobile device management tool 302 can also distribute one or more XML configuration documents to the one or more mobile computing devices 106a-n, where the one or more XML configuration documents can be employed to configure (or reconfigure) one or more hardware and/or software settings, parameters, operational modes, user access levels, applications, and/or the like associated with the one or more mobile computing devices 106a-n. Additionally, in various embodiments, the mobile device management tool 302 is configured to generate one or more data packages out of the biometric template management application and/or the one or more XML configuration documents and transmit the one or more data packages to the one or more mobile computing devices 106a-n. In various embodiments, the one or more data packages are configured to increase transmission efficiency by reducing network bandwidth requirements, as well as reduce computational resources by reducing a data size associated with the biometric template management application and/or the one or more XML configuration documents.

The secrets management system 314 is configured to generate, store, and/or distribute a symmetric shared secret across the one or more mobile computing devices 106a-n associated with the MBTA system 100. The symmetric shared secret is a cryptographic secret used to encrypt and decrypt BTs. The symmetric secret is shared (e.g., via the secrets management system 314) across all the mobile computing devices 106a-n such that one or more BTs are made available in a secure manner across the mobile computing devices 106a-n associated with the MBTA system 100. In various embodiments, the secrets management system 314 provides an application programming interface (API) configured to securely distribute the symmetric shared secret across the one or more mobile computing devices 106a-n.

In certain contexts, the data size associated with the one or more active BTs associated with the MBTA system 100 can be too large to be stored within the secrets management system. The FTP server 316 is configured to distribute active BTs and active PINs associated with the MBTA system 100 to the one or more mobile computing devices 106a-n. In some embodiments, the FTP server 316 supports one or more networking security protocols (e.g., transport layer security (TLS)) to encrypt data related to the active BTs and/or active PINs during transmission.

In some embodiments the FTP server 316 provides one or more APIs configured to manage the transmission of various types of data (e.g., biometric data, BT data, user authentication data, system configure data, and/or the like) between the MBTA external ancillary components 102 and the one or more mobile computing devices 106a-n. The FTP server 316 can employ APIs that serialize data uploads (e.g., uploads to the one or more mobile computing devices 106a-n) and return an error if an operation on a data file being uploaded is already in progress (e.g., a data file related to biometric data, BT data, user authentication data, system configure data, and/or the like). The one or more APIs provided by the FTP server 316 can be used to verify a checksum of the data file uploads and, in combination with an MQTT broker 318, generate and/or distribute one or more notifications (e.g., error notifications, update notifications, and/or the like) to the one or more mobile computing devices 106a-n.

Additionally or alternatively, the MBTA system 100 can generate and/or employ a public/private key pair to secure one or more data transmissions between the one or more mobile computing devices 106a-n and one or more of the components of the MBTA system 100 (e.g., the FTP server 316). The public/private key pair is a set of cryptographic keys created using a Rivest-Shamir-Adleman (RSA) algorithm. In some contexts, the public/private key pair can be used to encrypt the symmetric shared secret before the symmetric share secret is transmitted to the one or more mobile computing devices 106a-n. In some contexts, a public key of a particular public/private key par can be associated with the secrets management system 314, the FTP server 316, and/or the MQTT broker 318 respectively and the public key can be stored in the FTP server 316.

The MQTT broker 318 can be configured to generate and/or transmit one or more types of notifications to the one or more mobile computing devices 106a-n when a change to the active BTs (e.g., as stored in an active BT list and/or database such as the MBTA database 108), the active PINs (e.g., as stored in an active PIN list and/or database such as the MBTA database 108), and/or one or more portions of end user data (e.g., user authentication data, biometric data, etc.) has occurred. The MQTT broker 318 can also be configured to generate and/or transmit one or more types of notifications that indicate that a biometric template management application and/or one or more XML configuration documents generated by the mobile device management tool 302 has been transmitted to and/or or provisioned on the one or more mobile computing devices 106a-n.

In various embodiments, the MBTA database 108 can embody, be integrated with, or be embodied by the secrets management system 314, the FTP server 316, and/or the MQTT broker 318 in order to execute one or more methods or processes associated with the MBTA system 100. For example, in some embodiments, the MBTA database 108 may work in conjunction with the FTP server 316 to manage one or more portions of biometric data associated with one or more end users, one or more active BT lists associated with one or more active BTs related to the one or more end users, one or more active PIN lists associated with one or more active PINs related to the one or more active BTs related to the one or more end users, one or more XML configuration documents, one or more portions of user authentication data, and/or the like. It will be appreciated that the storage and processing components of the MBTA system 100 can be configured in various way to suit certain contexts, and that the exemplary systems, databases, and/or processing components described herein are described for purposes of detailing exemplary embodiments of the present disclosure and not for limitation.

Figure 4:
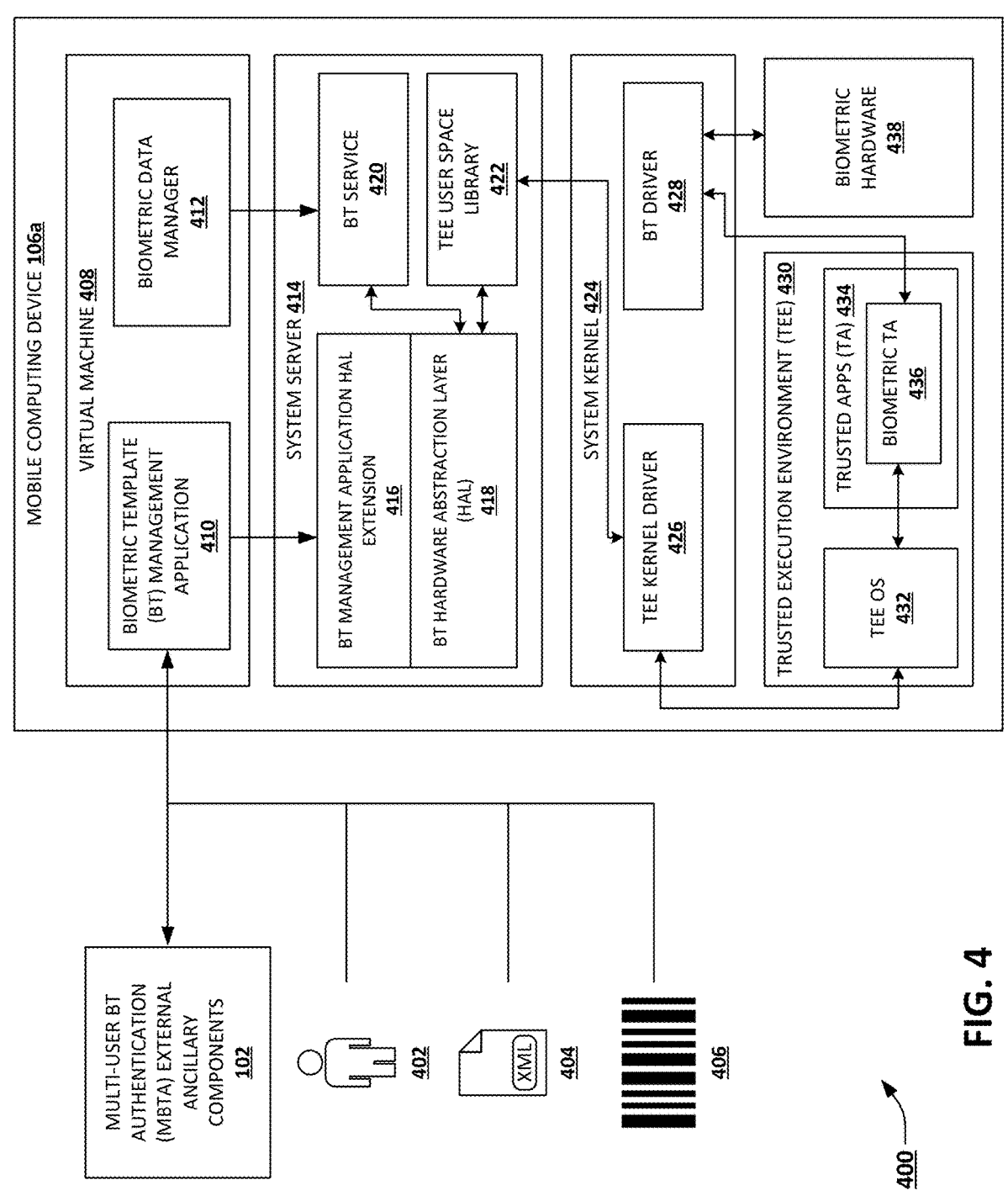
FIG. 4 illustrates a data flow diagram for facilitating secure MBTA, in accordance with one or more embodiments described herein.

FIG. 4 illustrates a data flow diagram for facilitating secure MBTA, in accordance with one or more embodiments described herein. Specifically, FIG. 4 depicts an exemplary environment 400 associated with one or more dataflows between the various components of the MBTA system 100 (e.g., the MBTA external ancillary components 102), an end user 402, an XML configuration document 404, a barcode 406, and a mobile computing device 106a. As shown, the mobile computing device 106a comprises a virtual machine 408, a system server 414, a system kernel 424, a trusted execution environment (TEE) 430, and/or biometric hardware 438. In various embodiments, one or more of the components associated with the virtual machine 408, the system server 414, the system kernel 424, the TEE 430, and/or the biometric hardware 438 can be embodied by and/or integrated with the components of the mobile computing device 106a described with respect to FIG. 2 (e.g., the processing circuitry 202, user interface 208, communication interface 210, and/or the optical engine 212).

In various contexts, the end user 402 can be any user associated with an MBTA system 100 related to a particular enterprise (e.g., a member of a workforce related to the particular enterprise, an administrator, and/or the like). The end user 402 can be associated with one or more portions of biometric data, one or more BTs, one or more PINs, and/or one or more portions of user authentication data.

As described herein, the XML configuration document 404 can be employed to configure (or reconfigure) one or more hardware and/or software settings and/or parameters (e.g., settings and/or parameters related to the virtual machine 408, the system server 414, the system kernel 424, the TEE 430, and/or the biometric hardware 438), one or more operational modes (e.g., a multi-user BT authentication mode), one or more user access levels, one or more applications (e.g., the BT management application 410), and/or the like associated with the one or more mobile computing devices 106a-n.

The barcode 406 can be associated with one or more particular XML configuration documents (e.g., the XML configuration document 404) related to the MBTA system 100. The mobile computing device 106a, by way of the optical engine 212, can scan the barcode 406 in order to obtain one or more portions of data related to the XML configuration document 404. For example, in some contexts, the mobile computing device 106a can scan the barcode 406 and, in response to scanning the barcode 406, the BT management application 410 can fetch an active BT list and/or an active PIN list associated with the MBTA system 100, wherein the active BT list and/or the active PIN list comprise one or more BTs and/or PINs related to one or more respective end users 402 currently enrolled in the MBTA system 100. As such, based on scanning the barcode 406 associated with the XML configuration document 404, the mobile computing device 106a can be directed to fetch data (e.g., the active BT list and/or the active PIN list) and incorporate the fetched data by, for example, updating, adding, deleting, syncing, and/or otherwise managing one or more portions of data stored locally on the mobile computing device 106a based in part on the fetched data.

As another example, based on scanning a barcode 406 associated with an XML configuration document 404, the mobile computing device 106a can be directed to (e.g., by the processing circuitry 202) fetch the XML configuration document 404 from the MBTA external ancillary components 102 (e.g., from the FTP server 316 or MBTA database 108) and configure, based on the XML configuration document 404, one or more hardware and/or software settings and/or parameters associated with the mobile computing device 106a.

The BT management application 410 is a software application related to the MBTA system 100 that can be loaded and/or run on a virtual machine 408 associated with the one or more mobile computing devices 106a-n. In some embodiments, the mobile device management tool 302 can facilitate the distribution and/or installment of the BT management application 410 in the one or more mobile computing devices 106a-n. In various embodiments, the BT management application 410 is configured to execute and/or cause execution of one or more portions of computer program code configured to perform the various methods and/or processes associated with secure MBTA. As depicted in FIGS. 10A-B and FIGS. 11A-B, in various embodiments, the BT management application 410 can be configured as an interactive dashboard application comprising one or more interactive display elements associated with the MBTA data 214 or the request 216. For example, the BT management application 410 can be configured to facilitate the capture, management, transmission, and/or storage of biometric data associated with an end user 402, user authentication data associated with the end user 402, and/or one or more portions of data related to the MBTA system 100.

As a non-limiting example, the BT management application 410 can be configured to execute one or more operations related to the capture of biometric data from a particular end user 402 and the subsequent generation of a BT based on the capture biometric data. For example, the particular end user 402, while interacting with the BT management application 410, can engage biometric hardware 438 configured as a fingerprint scanner in order to generate a BT based on biometric data (e.g., fingerprint data) captured by the biometric hardware 438. Furthermore, the BT management application 410 can generate a PIN associated with the newly generated BT associated with the particular end user 402. The PIN associated with the newly generated BT can be used by the particular end user 402 to authenticate (e.g., log in, sign in, etc.) the particular end user 402 on the one or more mobile computing devices 106a-n associated with the MBTA system 100. In this regard, the BT management application 410 can facilitate the transmission of the newly generated BT and/or PIN associated with the particular end user 402 for storage in the MBTA external ancillary components 102 (e.g., in the FTP server 316).

Furthermore, the BT management application 410 is configured to execute one or more operations related to authenticating a particular end user 402 to access a respective mobile computing device 106a. For example, the BT management application 410 can execute one or more biometric data matching algorithms to match one or more portions of biometric data associated with the particular end user 402 to a respective BT that has been previously generated based in part on the biometric data associated with the particular end user 402. For example, if an active BT database associated with the MBTA system 100 comprises a BT related with the particular end user 402, and the respective mobile computing device 106a has been updated to include the data associated with the active BT database, the BT management application 410 can employ the one or more biometric data matching algorithms to verify the biometric data associated to the end user 402 against the data related to the active BT database. In some contexts, the BT management application 410 can capture biometric data from the end user 402 via the biometric hardware 438 configured as a fingerprint scanner and compare the biometric data related to the end user 402 to the data associated with the active BT database that has been stored on the mobile computing device 106a. If the BT management application 410 confirms (e.g., via the biometric data matching algorithms) that the biometric data associated with the end user 402 matches a respective BT associated with the active BT database, the end user 402 can gain access to the mobile computing device 106a.

As described herein, various embodiments utilize a unique PIN associated with a BT related to a respective end user 402 in order to authenticate the end user 402 on a particular mobile computing device 106a. For example, an end user 402 may be prompted by the BT management application 410 to enter the PIN associated with the BT related to the end user 402 while the end user 402 is attempting to access (e.g., log in, sign in, etc.) the mobile computing device 106a. For example, in some embodiments, if the MBTA system 100 (e.g., by way of the BT management application 410) verifies that the end user 402 has entered an authentic PIN, the MBTA system 100 (e.g., by way of the BT management application 410) may prompt the end user 402 to provide biometric data (e.g., a fingerprint associated with the end user 402). The BT management application 410 can then confirm (e.g., via one or more biometric data matching algorithms) that the biometric data associated with the end user 402 matches a respective BT associated with the active BT database, the end user 402 can gain access to the mobile computing device 106a. In various alternate embodiments, the MBTA system 100 and/or the BT management application 410 can authenticate a particular end user 402 based on the biometric data associated with the end user 402 alone and do not require the end user 402 to provide the PIN associated with the respective BT related to the end user 402.

As depicted in FIG. 4, the BT management application 410 is configured to integrate with the MBTA system 100 as well as one or more internal components of the mobile computing device 106a. As described herein, the BT management application 410 is an interactive software application designed to facilitate the configuration, reconfiguration, and/or augmentation of one or more internal components of the mobile computing device 106a in order to execute one or more operations related to secure MBTA on the mobile computing device 106a. In various embodiments, the one or more internal components are mobile computing device components that were originally configured by the vendor and/or manufacturer of the mobile computing device 106a. However, the BT management application 410 (and/or the BT management application hardware abstraction layer (HAL) extension 416) are configured to leverage (e.g., operate and/or reconfigure) the mobile computing device components that were originally configured by the vendor and/or manufacturer of the mobile computing device 106a.

In addition to the BT management application 410, the virtual machine 408 of the mobile computing device 106a comprises a biometric data manager 412. The biometric data manager 412 can comprises one or more portions of executable computer program code configured to transmit data (e.g., instructions, directions, and/or the like) to one or more other internal components of the mobile computing device 106a to engage one or more services associated with BTs. For example, the biometric data manager 412 integrates with the BT service 420 of the system server 414. The system server 414 also comprises a BT management application HAL extension 416, a BT HAL 418, TEE user space library 422. The BT HAL 418 comprises one or more portions of computer program code configured to provide a mobile device driver interface that allows one or more software applications to communicate with the hardware associated with the mobile computing device 106a. The BT management application HAL extension 416 comprises one or more portions of executable program code related to the BT management application 410 that are designed to integrate with and/or configure the BT HAL 418 such that the BT management application 410 can interface with, operate, control, and/or otherwise manage one or more pieces of hardware associated with the mobile computing device 106a such as, for example, the biometric hardware 438. The TEE user space library 422 comprises one or more portions of executable program code (e.g., one or more functions, methods, APIs, and/or the like) configured to allow the BT management application 410 to interface with the TEE 430 of the mobile computing device 106a.

The system kernel 424 is associated with the operating system (OS) of a particular mobile computing device 106a.

In many contexts, the system kernel 424 has control over the mobile computing device 106a and can facilitate communication between the hardware and software components of the mobile computing device 106a. In various embodiments, the system kernel 424 comprises a TEE kernel driver 426 and a BT driver 428. The TEE kernel driver 426 comprises executable program code configured to integrate with, operate, control, and/or otherwise manage one or more components of the TEE 430. For example, the TEE kernel driver 426 can integrate with, operate, control, and/or otherwise communicate with the TEE OS 432 of the TEE 430.

The BT driver 428 is configured to integrate with, operate, and/or facilitate communication between one or more biometric applications associated with the TEE 430 and one or more pieces of hardware associated with the mobile computing device 106a. For example, the BT driver 428 can facilitate communications between the biometric trusted application (TA) 436 of the TAs 434 and the biometric hardware 438. In various embodiments, the biometric TA 436 is configured to encrypt and/or save a BT associated with a particular end user 402. For example, in various embodiments, the biometric TA 436 can encrypt the BT associated with the end user 402 with a symmetric shared secret associated with the MBTA system 100. Furthermore, the biometric TA 436 can save the encrypted BT associated with the end user 402 as a data file and generate a filename associated with the data file comprising the encrypted BT that incorporates a PIN associated with the BT related to the end user 402.

In various embodiments, the biometric hardware 438 of the mobile computing device 106a is configured to capture, read, sense, and/or otherwise obtain biometric data associated with a particular end user 402. In various contexts, the biometric data associated with the particular end user 402 can comprise, but is not limited to, fingerprint data, palm data, vein data, retina and/or iris data, voice data, facial feature data (e.g., face shape, eye shape, nose shape, etc.), body feature data (e.g., car shape), DNA data, handwriting data, and/or any other physical and/or personal data related to the particular end user 402. As such, the biometric hardware 438 of the mobile computing device 106a can comprise one or more sensors, cameras, fingerprint scanners, palm scanners, eye scanners, one or more hardware components configured to sense the handwriting of an end user 402, one or more microphones, and/or any combination thereof.

As described herein, FIGS. 10A-B and FIGS. 11A-B illustrate an exemplary user interface of a BT management application 410 rendered on a mobile computing device 106a associated with an MBTA system 100, in accordance with one or more embodiments described herein. Specifically, FIGS. 10A-B depict exemplary user interfaces designed to facilitate the enrollment of an end user 402 that include one or more interactive display elements 1002-1012 configured for receiving username information, generating a PIN to associate with a BT related to the end user 402, and/or integrating with the biometric hardware 438 of the mobile computing device 106a in order to capture biometric data (e.g., fingerprint data) from the end user 402. For example the interactive display element 1010 is configured to integrate with biometric hardware 438 of the mobile computing device 106a in order to capture fingerprint data for generating a BT related to the fingerprint of the end user 402.

FIG. 11A depicts an exemplary user interface of a BT management application 410 comprising interactive display elements 1102-1106 configured to facilitate the deletion of a PIN and/or a BT associated with a particular end user 402. FIG. 11B depicts an exemplary user interface of a BT management application 410 comprising interactive display elements 1108-1114 configured to facilitate the recovery of a PIN associated with a particular end user 402.

Exemplary Processes and Methods of the Present Disclosure

Figure 5:
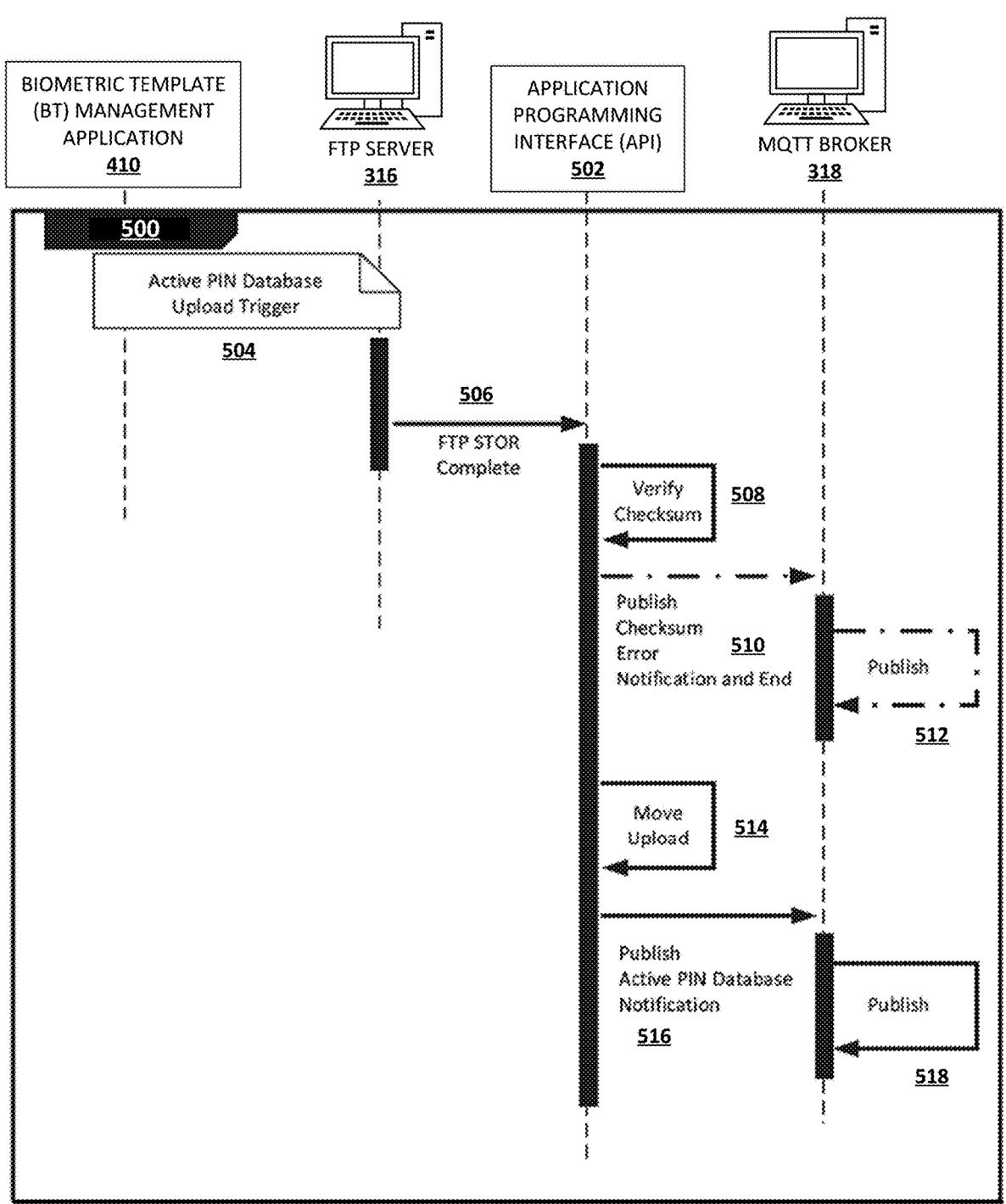
FIG. 5 illustrates a process flow diagram for updating an active personal identification number (PIN) database associated with an MBTA system, in accordance with one or more embodiments described herein.

FIG. 5 illustrates a process flow diagram detailing a computer-implemented method 500 configured for adding and/or updating an active personal identification number (PIN) database associated with a multi-user biometric template authentication (MBTA) system 100 related to a particular enterprise, in accordance with one or more embodiments described herein. In various embodiments, the active PIN database comprises a list of one or more PINs associated with one or more respective biometric templates (BTs) related to one or more respective end users 402 that are currently enrolled in the MBTA system 100 and a representation (e.g., a structured list, a copy of the active BT database, and/or the like) associated with the active PIN database is stored locally on the one or more mobile computing devices 106a-n. As shown in FIG. 5, the computer-implemented method 500 utilizes at least the BT management application 410, the FTP server 316, an application programming interface (API) 502, and/or the MQTT broker 318 to add and/or update a particular PIN in the active PIN database associated with the MBTA system 100.

The computer-implemented method 500 begins at step 504 in which the BT management application 410 is caused to trigger (e.g., initiate) the generation and/or update of a PIN associated with a particular end user 402. As described herein, in various embodiments, the BT management application 410 associated with a particular mobile computing device 106a can be employed to collect biometric data (e.g., fingerprint data) from an end user 402, generate a BT based on the biometric data and generate a security PIN associated with the BT related to the end user 402. The PIN can be used in conjunction with the BT to authenticate the end user 402 on any one of the one or more mobile computing devices 106a-n.

At step 506, the BT management application 410 can cause the mobile computing device 106a to transmit the newly generated PIN to the FTP server 316 for verification and storage. In various embodiments, the BT management application 410 can generate a data file associated with the PIN and assign the data file a unique filename comprising the PIN, a device serial number associated with the mobile computing device 106a used to generate the PIN, an embedded checksum associated with the data file comprising the PIN, as well as a nonce. For example, the filename format associate with the PIN data file can be configured as: <user's BT PIN>_<device serial number>_<checksum>_<nonce>. The nonce in the PIN data file is a randomly generated number that is returned to the BT management application 410 of the mobile computing device 106a if a checksum verification error occurs so that the BT management application 410 can determine which transaction failed. In various embodiments, the PIN data file can be compressed into a packaged file format.

At step 508, the MBTA system 100 can employ the API 502 to verify the checksum associated with the PIN data file order to ensure that the PIN data file has not been corrupted (e.g., ensure that one or more portions of data (bits) have not been lost or altered) in transit. In various embodiments, a CRC32 (cyclic redundancy check 32) algorithm that utilizes polynomial division is used to hash byte sequences associated with the PIN data file to 32-bit values. The CRC32 algorithm can also be used to verify the checksum associated with the PIN data file to ensure data integrity of the PIN data file.

At step 510, it is determined whether there was an error verifying the checksum of the PIN data file. If there was an error verifying the checksum of the PIN data file, the computer-implemented method 500 proceeds to step 512. If there was no error verifying the checksum of the PIN data file, the computer-implemented method 500 proceeds to step 514.

At step 512, if it was determined that there was an error verifying the checksum of the PIN data file, the MQTT broker 318 can publish (e.g., transmit) a notification to the BT management application 410 associated with the mobile computing device 106a detailing that there was a checksum verification error. In some embodiments, the BT management application 410 can automatically retransmit the PIN data file to the FTP server 316 again so that the API 502 can attempt to verify the checksum again.

At step 514, the API 502 can move the PIN data file that has been uploaded to the FTP server 316 to a correct folder and/or storage location in the FTP server. Additionally or alternatively, the PIN data file and/or the associated PIN can be stored in an active PIN database and/or active PIN list associated with the MBTA system 100 (e.g., in the FTP server 316 and/or the MBTA database 108). In various embodiments, the MBTA system 100 can also update the PIN data file to remove the device serial number and/or the nonce when moving the PIN data file to the correct folder and/or storage location. For example, the filename can be updated to a format such as: <user's BT PIN>_<checksum>.

At step 516, it is determined whether the PIN data file has been moved to the correct storage location (e.g., a storage location comprises the active PIN list) and the API 502 can initiate the publication of an active PIN database notification. At step 518, the MQTT broker 318 can publish (e.g., transmit) the active PIN database notification to the one or more mobile computing devices 106a-n. In some embodiments, the active PIN database notification can comprise the active PIN list such that the one or more mobile computing devices 106a-n can be updated to contain the most current active PIN list associated with the MBTA system 100. Additionally or alternatively, in some embodiments, the active PIN database notification published (e.g., transmitted) by the MQTT broker 318 can cause the one or more mobile computing devices 106a-n to fetch (e.g., via one or more APIs associated with the active PIN database notification) and/or otherwise obtain the active PIN list from the MBTA system 100 (e.g., from the FTP server 316) in order to update the one or more PINs currently stored on the one or more mobile computing devices 106a-n. In this way, each active end user 402 currently enrolled and/or associated with the MBTA system 100 can use a respective PIN to authenticate themselves on any one of the one or more mobile computing devices 106a-n.

Figure 6:
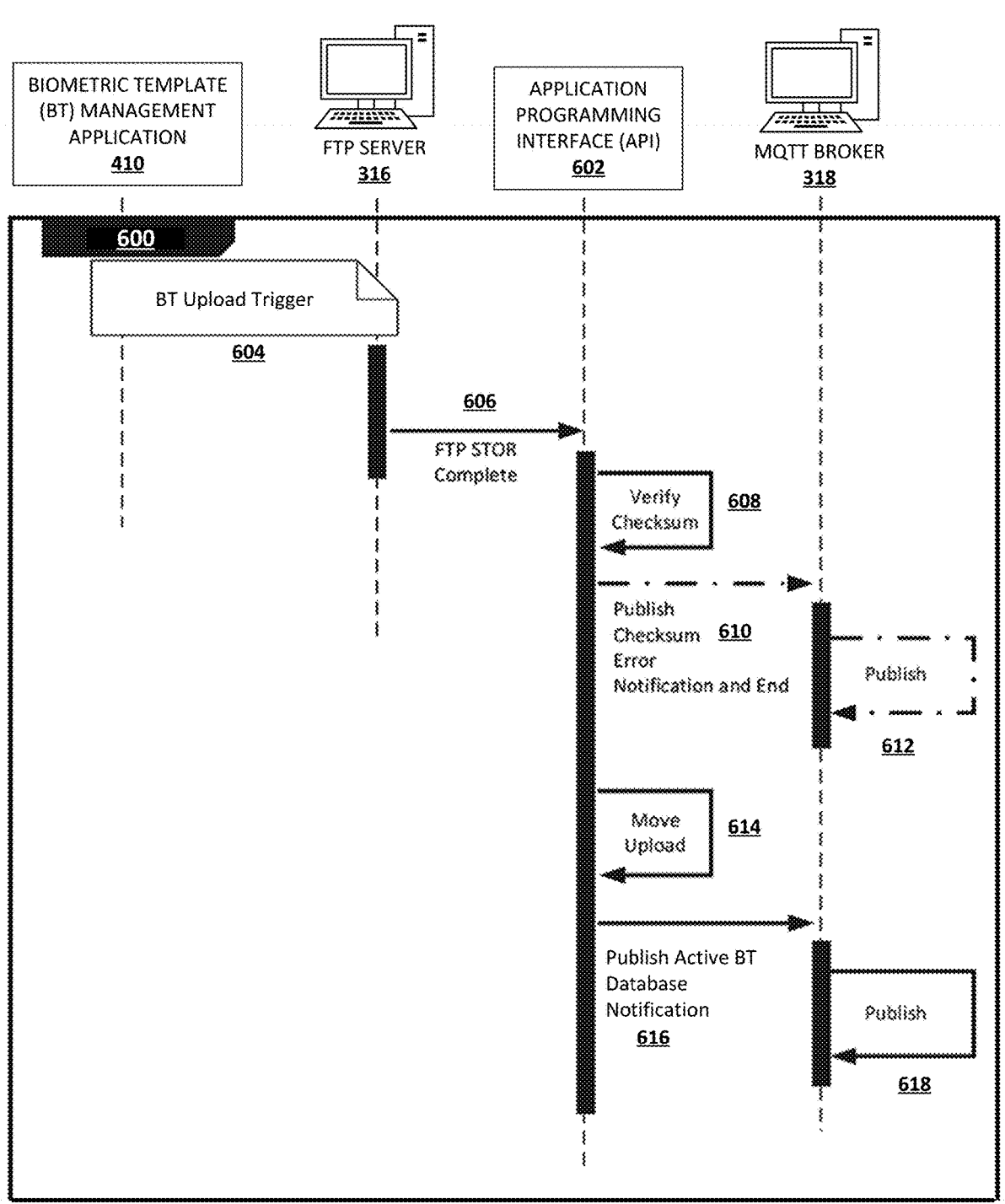
FIG. 6 illustrates a process flow diagram for adding and/or updating a biometric template (BT) in an active BT database, in accordance with one or more embodiments described herein.

FIG. 6 illustrates a process flow diagram detailing a computer-implemented method 600 configured for adding and/or updating a BT in an active BT database associated with the MBTA system 100, in accordance with one or more embodiments described herein. In various embodiments, the active BT database comprises a list of one or more BTs associated with one or more respective end users 402 that are currently enrolled in the MBTA system 100 and a representation (e.g., a structured list, a copy of the active BT database, and/or the like) associated with the active BT database is stored locally on the one or more mobile computing devices 106a-n. As shown in FIG. 6, the computer-implemented method 600 utilizes at least the BT management application 410, the FTP server 316, an API 602, and/or the MQTT broker 318 to add and/or update a BT in the active BT database associated with the MBTA system 100.

The computer-implemented method 600 begins at step 604 in which the BT management application 410 is caused to trigger (e.g., initiate) the generation of a BT associated with a particular end user 402. As described herein, in various embodiments, the BT management application 410 associated with a particular mobile computing device 106a can be employed to collect biometric data (e.g., fingerprint data) from an end user 402 and generate a BT based on the biometric data related to the end user 402. The BT can be used in conjunction with the PIN to authenticate the end user 402 on any one of the one or more mobile computing devices 106a-n.

At step 606, the BT management application 410 can cause the mobile computing device 106a to transmit the newly generated BT to the FTP server 316 for verification and storage. In various embodiments, the BT management application 410 can generate a BT data file associated with the BT and assign the BT data file a unique filename comprising the PIN, a device serial number associated with the mobile computing device 106a used to generate the PIN, an embedded checksum associated with the data file comprising the PIN, as well as a nonce. For example, the filename format associate with the PIN data file can be configured as: <user's BT PIN>_<device serial number>_<checksum>_<nonce>. The nonce in the BT data file is a randomly generated number that is returned to the BT management application 410 of the mobile computing device 106a if a checksum verification error occurs so that the BT management application 410 can determine which transaction failed. In various embodiments, the BT data file can be compressed into a packaged file format.

At step 608, the MBTA system 100 can employ the API 602 to verify the checksum associated with the BT data file order to ensure that the BT data file has not been corrupted (e.g., ensure that one or more portions of data (bits) have not been lost or altered) in transit. In various embodiments, a CRC32 algorithm that utilizes polynomial division is used to hash byte sequences associated with the BT data file to 32-bit values. The CRC32 algorithm can also be used to verify the checksum associated with the BT data file to ensure data integrity of the BT data file.

At step 610, it is determined whether there was an error verifying the checksum of the BT data file. If there was an error verifying the checksum of the BT data file, the computer-implemented method 600 proceeds to step 612. If there was no error verifying the checksum of the BT data file, the computer-implemented method 600 proceeds to step 614.

At step 612, if it was determined that there was an error verifying the checksum of the BT data file, the MQTT broker 318 can publish (e.g., transmit) a notification to the BT management application 410 associated with the mobile computing device 106a detailing that there was a checksum verification error. In some embodiments, the BT management application 410 can automatically retransmit the BT data file to the FTP server 316 again so that the API 602 can attempt to verify the checksum again.

At step 614, the API 602 can move the BT data file that has been uploaded to the FTP server 316 to a correct folder and/or storage location in the FTP server. Additionally or alternatively, the BT data file and/or the associated BT can be stored in an active BT database and/or active BT list associated with the MBTA system 100 (e.g., in the FTP server 316 and/or the MBTA database 108). In various embodiments, the MBTA system 100 can also update the BT data file to remove the device serial number and/or the nonce when moving the BT data file to the correct folder and/or storage location. For example, the filename can be updated to a format such as: <user's BT PIN>_<checksum>.

At step 616, it is determined whether the BT data file has been moved to the correct storage location (e.g., a storage location comprises the active BT list) and the API 602 can initiate the publication of an active BT database notification. At step 618, the MQTT broker 318 can publish (e.g., transmit) the active BT database notification to the one or more mobile computing devices 106a-n. In some embodiments, the active BT database notification can comprise the active BT list such that the one or more mobile computing devices 106a-n can be updated to contain the most current active BT list associated with the MBTA system 100. Additionally or alternatively, in some embodiments, the active BT database notification published (e.g., transmitted) by the MQTT broker 318 can cause the one or more mobile computing devices 106a-n to fetch (e.g., via one or more APIs associated with the active BT database notification) and/or otherwise obtain the active BT list from the MBTA system 100 (e.g., from the FTP server 316) in order to update the one or more BTs currently stored on the one or more mobile computing devices 106a-n. In this way, each active end user 402 currently enrolled and/or associated with the MBTA system 100 can authenticate themselves on any one of the one or more mobile computing devices 106a-n by providing the biometric data associated with the end user 402 that was used to generate the BT to any respective mobile computing device of the one or more mobile computing devices 106a-n. As a non-limiting example, an end user 402 can provide a fingerprint (e.g., via the biometric hardware 438) and the BT management application 410 can determine whether the fingerprint matches a respective BT comprised in the active BT list stored locally on the mobile computing device 106a. If it is determined (e.g., via one or more biometric data matching algorithms) that the provided biometric data (e.g., the fingerprint) matches the respective BT comprised in the active BT list stored locally on the mobile computing device 106a then the end user 402 will be allowed access to the mobile computing device 106a.

Figure 7:
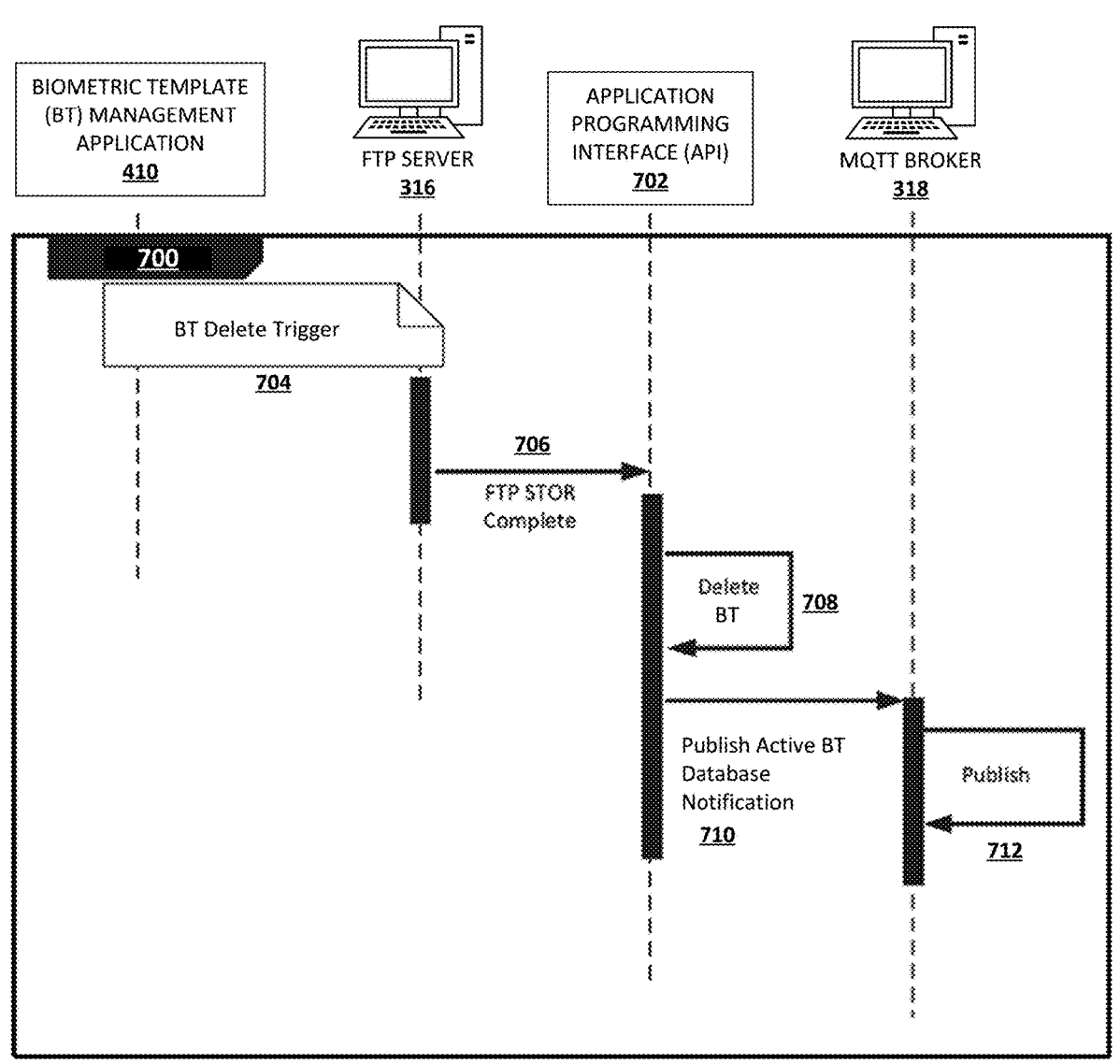
FIG. 7 illustrates a process flow diagram for deleting a BT from an active BT database, in accordance with one or more embodiments described herein.

FIG. 7 illustrates a process flow diagram detailing a computer-implemented method 700 configured for deleting a BT from an active BT database, in accordance with one or more embodiments described herein. As described herein, in various embodiments, the active BT database comprises a list of one or more BTs associated with one or more respective end users 402 that are currently enrolled in the MBTA system 100 and a representation (e.g., a structured list, a copy of the active BT database, and/or the like) associated with the active BT database is stored locally on the one or more mobile computing devices 106a-n. As shown in FIG. 7, the computer-implemented method 700 utilizes at least the BT management application 410, the FTP server 316, an API 702, and/or the MQTT broker 318 to delete a particular BT from the active BT database associated with the MBTA system 100.

The computer-implemented method 700 begins at step 704 in which the BT management application 410 is caused to trigger (e.g., initiate) the deletion of a particular BT associated with a respective end user 402. For example, the end user 402 may interact with one or more interactive display elements associated with the BT management application 410 (e.g., interactive display elements 1102-1106) and rendered on a particular mobile computing device 106a to cause the BT management application 410 to initiate the deletion of the particular BT. In various embodiments, the BT management application 410 can indicate the particular BT to be deleted based on at least data related to the PIN of the end user 402, a device serial number of the mobile computing device 106a, and/or a randomly generated nonce associated with the BT and transmit the data to the FTP server 316.

At step 706, the FTP server 316 can verify the BT to be deleted from the active BT database based on at least data related to the PIN of the end user 402, a device serial number of the mobile computing device 106a, and/or a randomly generated nonce associated with the BT. Once the BT has been verified by the FTP server 316, the computer-implemented method 700 can proceed to step 708 in which the API 702 can cause deletion of the BT from the active BT database.

At step 710, the API 702 can initiate the publication of an active BT database notification. At step 712, the MQTT broker 318 can publish (e.g., transmit) the active BT database notification to the one or more mobile computing devices 106a-n. In some embodiments, the active BT database notification can comprise the active BT list such that the one or more mobile computing devices 106a-n can be updated to contain the most current active BT list associated with the MBTA system 100. Additionally or alternatively, in some embodiments, the active BT database notification published (e.g., transmitted) by the MQTT broker 318 can cause the one or more mobile computing devices 106a-n to fetch (e.g., via one or more APIs associated with the active BT database notification) and/or otherwise obtain the active BT list from the MBTA system 100 (e.g., from the FTP server 316) in order to update the one or more BTs currently stored on the one or more mobile computing devices 106a-n.

Figure 8:
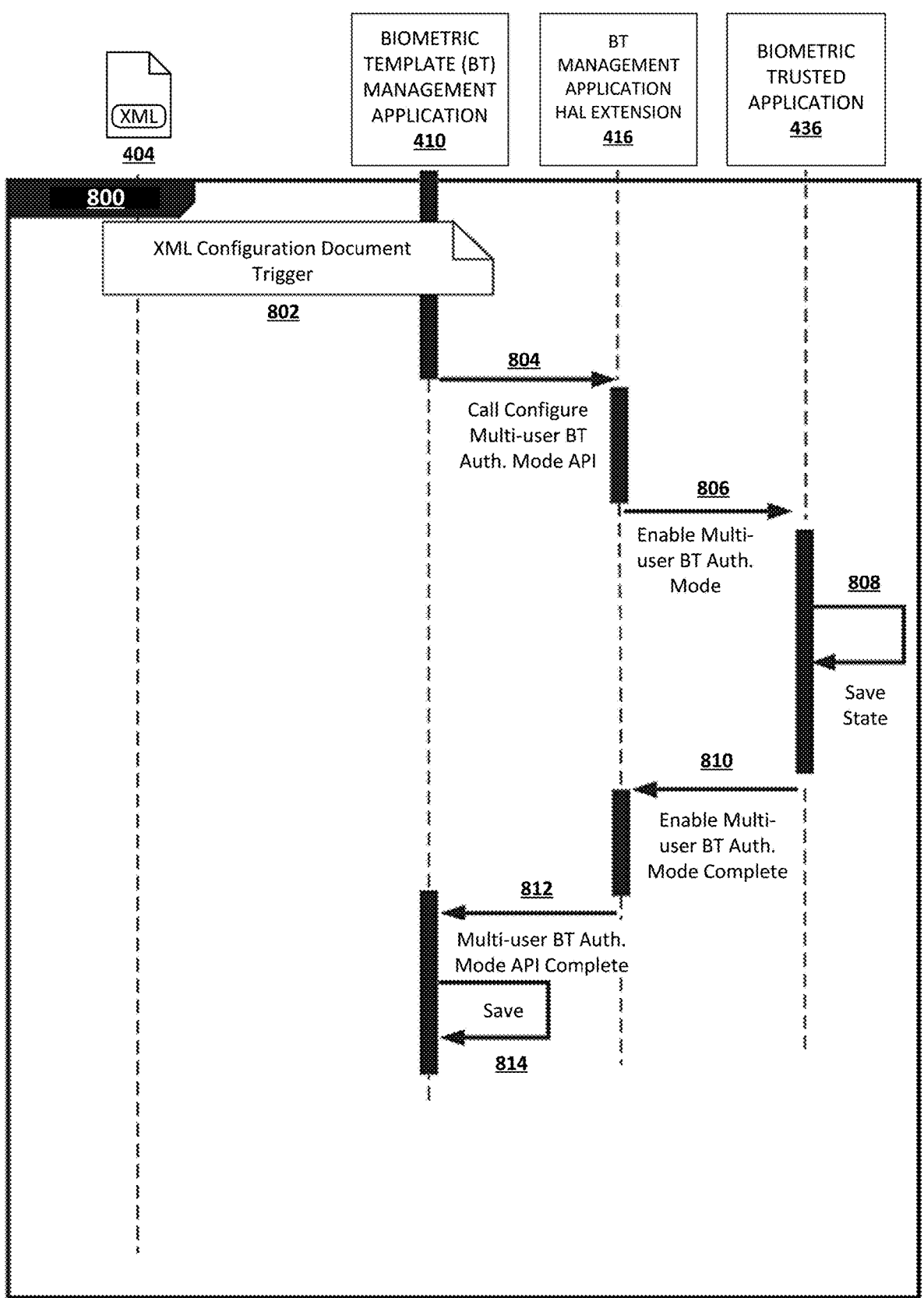
FIG. 8 illustrates a process flow diagram for enabling or disabling a multi-user biometric authentication mode for one or more mobile computing devices, in accordance with one or more embodiments described herein.

FIG. 8 illustrates a process flow diagram detailing a computer-implemented method 800 configured for enabling or disabling a multi-user BT authentication mode for the one or more mobile computing devices 106a-n associated with the MBTA system 100, in accordance with one or more embodiments described herein. As described herein, the XML configuration document 404 can be employed to configure (or reconfigure) one or more hardware and/or software settings and/or parameters (e.g., settings and/or parameters related to the virtual machine 408, the system server 414, the system kernel 424, the TEE 430, and/or the biometric hardware 438), one or more operational modes (e.g., a multi-user BT authentication mode), one or more user access levels, one or more applications (e.g., the BT management application 410), and/or the like associated with the one or more mobile computing devices 106a-n. As shown in FIG. 8, the computer-implemented method 800 utilizes at least the XML configuration document 404, the BT management application 410, the BT management application hardware abstraction layer (HAL) extension 416, and/or the biometric trusted application (TA) 436 to enable or disable a multi-user BT authentication mode for the one or more mobile computing devices 106a-n associated with the MBTA system 100.

The computer-implemented method 800 begins at step 802 in which the BT management application 410 is caused to trigger (e.g., initiate) the enabling or disabling of a multi-user BT authentication mode in the one or more mobile computing devices 106a-n. In various embodiments, the BT management application 410 can cause the triggering of the enabling or disabling of the multi-user BT authentication mode of a particular mobile computing device 106a in response to receiving, from the MQTT broker 318, an XML configuration document notification comprising data related to the XML configuration document 404. In this example, the XML configuration document 404 can be associated with one or more portions of executable program code configured to enable and/or disable one or more parameter settings and/or access permissions of the mobile computing device 106a related to a multi-user BT authentication operational mode.

In various other embodiments, the BT management application 410 can cause the triggering of the enabling or disabling of the multi-user BT authentication mode of a particular mobile computing device 106a in response to the particular mobile computing device 106a scanning a barcode (e.g., the barcode 406) associated with the XML configuration document 404. The mobile computing device 106a, by way of the optical engine 212, can scan the barcode 406 in order to obtain one or more portions of data (e.g., executable program code) related to the XML configuration document 404 and thereby trigger the enabling or disabling of the multi-user BT authentication mode.

At step 804, the BT management application can call an API constructed to configure (e.g., enable) a multi-user BT authentication mode for the mobile computing device 106a. In various embodiments, the API configured to direct the BT management application HAL extension 416 to adjust the hardware and/or software parameters of the mobile computing device 106a. At step 806, the BT management application HAL extension 416 can enable (or disable) the multi-user BT authentication mode by communicating with the biometric TA 436 (e.g., comprised in the TAs 434 of the TEE 430). As many security risks may be involved in the use of biometric data to authenticate an end user 402, certain application (e.g., the biometric TA 436) are deployed by the TEE (e.g., TEE 430) of a mobile computing device 106a to ensure data security and/or integrity. By enabling the multi-user BT authentication mode of the biometric TA 436 of a mobile computing device 106a, any end user 402 enrolled in the MBTA system 100 (e.g., any end user associated with an active BT and/or PIN) can be authenticated on the mobile computing device 106a. Alternatively, in contexts in which the multi-user BT authentication mode is disabled for a particular mobile computing device 106a, the one or more end users 402 associated with the MBTA system 100 may not be authenticated on the particular mobile computing device 106a by using biometric data and/or a PIN associated with a respective BT comprised in the active BT database and/or active PIN database of the MBTA system 100.

At step 808, the biometric TA 436 is configured to save the state of the mobile computing device 106a (e.g., save the one or more system parameters updated by the multi-user BT authentication mode API). For example, if the multi-user BT authentication mode associated with the mobile computing device 106a is enabled or disabled, the biometric TA 436 is configured to save the current state of the mobile computing device 106a as it relates to the multi-user BT authentication mode.

At step 810, the BT management application HAL extension 416 determines whether the multi-user BT authentication mode has been successfully enabled (or, in some contexts, disabled). At step 812, the BT management application 410 determines whether the one or more operations associated with the multi-user BT authentication mode API have been successfully executed. At step 814, the BT management application 410 saves the current system state (e.g., one or more system parameter settings indicating that the multi-user BT authentication mode has been successfully enabled (or disabled)) and the computer-implemented method 800 is terminated.

Figure 9:
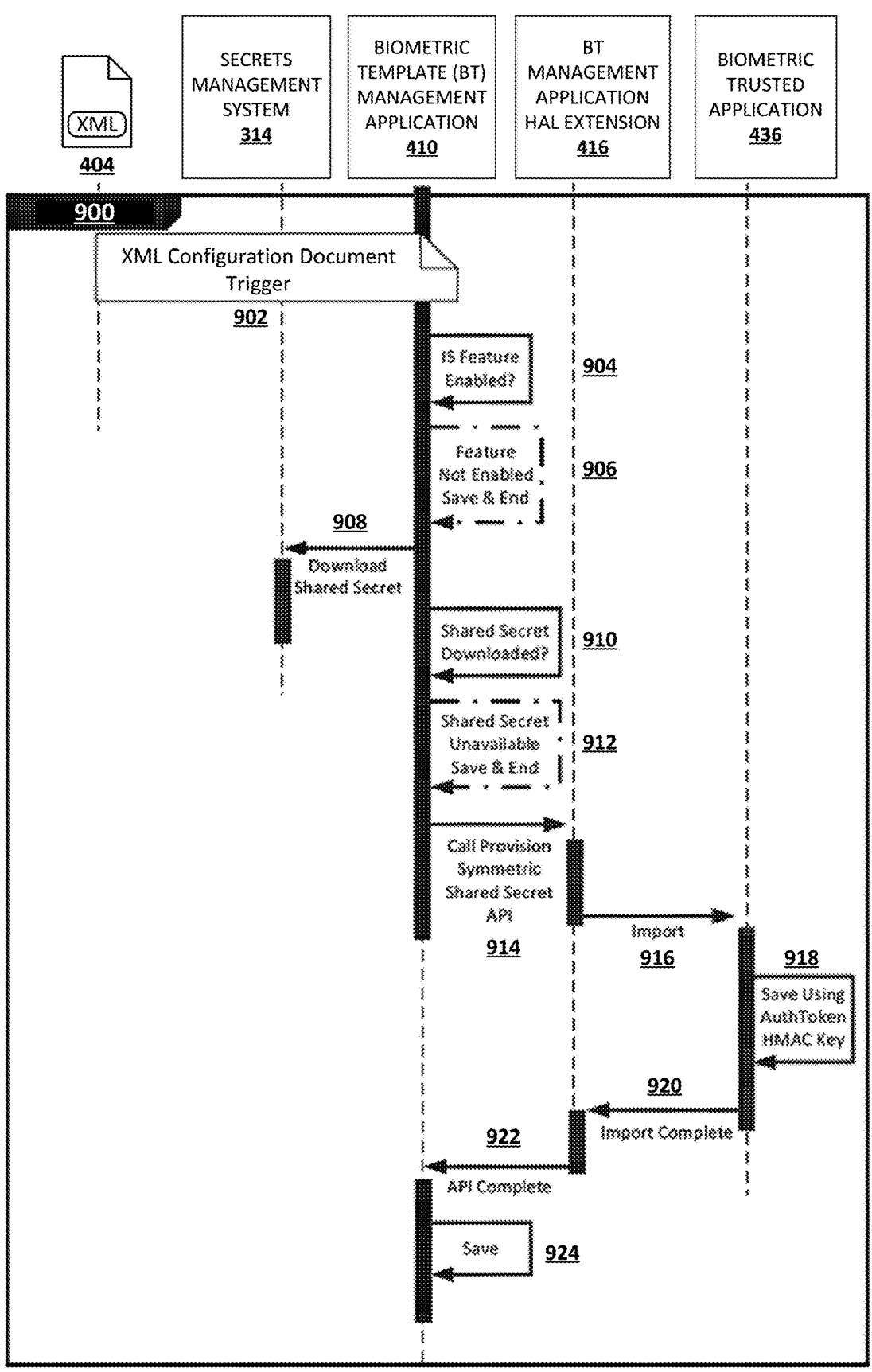
FIG. 9 illustrates a process flow diagram for importing a symmetric shared secret into one or more mobile computing devices for biometric template encryption purposes, in accordance with one or more embodiments described herein.

FIG. 9 illustrates a process flow diagram detailing a computer-implemented method 900 configured for importing and provisioning a symmetric shared secret in one or more mobile computing devices 106a-n for BT encryption purposes, in accordance with one or more embodiments described herein. As described herein, the secrets management system 314 is configured to generate, store, and/or distribute a symmetric shared secret across the one or more mobile computing devices 106a-n associated with the MBTA system 100. The symmetric shared secret is a cryptographic secret that can be used by a mobile computing device 106a to encrypt and decrypt BTs. As shown in FIG. 9, the computer-implemented method 800 utilizes at least the XML configuration document 404, the secrets management system 314, the BT management application 410, the BT management application hardware abstraction layer (HAL) extension 416, and/or the biometric TA 436 to import and provision the symmetric shared secret in the one or more mobile computing devices 106a-n associated with the MBTA system 100.

The computer-implemented method 900 begins at step 902 in which the BT management application 410 is caused to trigger (e.g., initiate) the importing and/or provisioning of the symmetric shared secret in the one or more mobile computing devices 106a-n. In various embodiments, the BT management application 410 can cause the triggering of the importing and/or provisioning of the symmetric shared secret in a particular mobile computing device 106a in response to receiving, from the MQTT broker 318, an XML configuration document notification comprising data related to the XML configuration document 404. In this example, the XML configuration document 404 can be associated with one or more portions of executable program code configured to enable and/or disable one or more parameter settings and/or access permissions of the mobile computing device 106a related to provisioning a symmetric shared secret generated by the secrets management system 314.

In various other embodiments, the BT management application 410 can cause the importing and/or provisioning of the symmetric shared secret in a particular mobile computing device 106a in response to the particular mobile computing device 106a scanning a barcode (e.g., the barcode 406) associated with the XML configuration document 404. The mobile computing device 106a, by way of the optical engine 212, can scan the barcode 406 in order to obtain one or more portions of data (e.g., executable program code) related to the XML configuration document 404 and thereby trigger the importing and/or provisioning of the symmetric shared secret generated by the secrets management system 314.

At step 904, the BT management application 410 determines whether a symmetric shared secret associated with the MBTA system 100 has been enabled (e.g., previously imported and/or provisioned) on the mobile computing device 106a. If the BT management application 410 determines that the symmetric shared secret associated with the MBTA system 100 has not been enabled, the computer-implemented method 900 proceeds to step 906. At step 906, the BT management application 410 saves the current system state (e.g., one or more system parameter settings) associated with the mobile computing device 106a and proceeds to step 908.

At step 908, the BT management application 410 causes the mobile computing device 106a to download (e.g., via the network 104) and/or otherwise obtain the symmetric shared secret from the secrets management system 314 associated with the MBTA system 100. At step 910, the BT management application 410 determines whether the symmetric shared secret has been successfully downloaded and/or received from the secrets management system 314. If it is determined that the symmetric shared secret was not successfully downloaded and/or received from the secrets management system 314 (e.g., the symmetric shared secret was determined to be unavailable), the computer-implemented method 900 proceeds to step 912. At step 912, the BT management application 410 saves the current system state (e.g., one or more system parameter settings) associated with the mobile computing device 106a and the computer-implemented method 900 terminates. However, if it is determined that the symmetric shared secret was successfully downloaded and/or received from the secrets management system 314, the computer-implemented method 900 proceeds to step 914.

At step 914, the BT management application 410 is configured to call an API constructed to provision the symmetric shared secret on the mobile computing device 106a. At step 916, in response to the API called by the BT management application 410, the BT management application HAL extension 416 is directed to import the symmetric shared secret. The BT management application HAL extension 416 is also directed to transmit and/or otherwise communicate the symmetric shared secret to the biometric TA 436 associated with the TEE 430.

At step 918, the biometric TA 436 is configured to encrypt the symmetric shared secret with a unique authentication token such as, for example, a hash-based message authentication code (HMAC) key associated with the mobile computing device 106a. In various embodiments, once the symmetric shared secret is encrypted using the HMAC key associated with the mobile computing device 106a, the encrypted symmetric shared secret can be persisted (e.g., save, stored, etc.) in a data file that is accessible to the TEE OS 432.

At step 920, the BT management application HAL extension 416 determines whether the symmetric shared secret was successfully imported and/or saved by the biometric TA 436. At step 922, the BT management application 410 determines whether the API constructed to provision the symmetric shared secret on the mobile computing device 106a has been successfully completed. At step 924, the BT management application 410 saves the current system state (e.g., one or more system parameter settings) associated with the mobile computing device 106a and the computer-implemented method 900 is terminated.

FIG. 12 illustrates a process flow diagram for providing secure MBTA across one or more mobile computing devices 106a-n, in accordance with one or more embodiments described herein. Specifically, FIG. 12 illustrates a method 1200 for collecting biometric data from an end user 402 in order to generate a BT based on the biometric data related to the end user 402 In one or more embodiments, the method 1200 is associated with the MBTA system 100. Additionally or alternatively, in various embodiments, the method 1200 is associated with the one or more mobile computing devices 106a-n in conjunction with the MBTA system 100.

In various embodiments, the method 1200 begins with an operation 1202 which is configured to receive a request to generate a biometric template associated with a first end user, where the request to generate the biometric template associated with the first end user is generated via a first mobile computing device associated with a multi-user biometric template authentication (MBTA) system. For example, as described herein, an end user 402 may engage the BT management application 410 (e.g., by way of one or more interactive display elements rendered on an electronic display associated with a particular mobile computing device 106a) in order to generate a BT and/or associated PIN. As such, the BT management application 410 can generate a request 216 configured to trigger the enrollment of the end user 402 into the MBTA system 100.

The method 1200 also includes an operation 1204 that is configured to in response to receiving the request, collect biometric data associated with the first end user. For example, the BT management application 410 can collect, in conjunction with the biometric hardware 438, biometric data associated with a particular end user 402. As described herein, in various contexts, the biometric data associated with the particular end user 402 can comprise, but is not limited to, fingerprint data, palm data, vein data, retina and/or iris data, voice data, facial feature data (e.g., face shape, eye shape, nose shape, etc.), body feature data (e.g., car shape), DNA data, handwriting data, and/or any other physical and/or personal data related to the particular end user 402. As such, the biometric hardware 438 of the mobile computing device 106a can comprise one or more sensors, cameras, fingerprint scanners, palm scanners, eye scanners, one or more hardware components configured to sense the handwriting of an end user 402, one or more microphones, and/or any combination thereof.

The method 1200 also includes an operation 1206 that is configured to generate, based on the biometric data, the biometric template associated with the first end user. For example, the BT management application 410 can generate (e.g., in conjunction with the processing circuitry 202) a biometric template based on the biometric data (e.g., fingerprint data, palm data, facial feature data, and/or the like) associated with the end user 402.

The method 1200 also includes an operation 1208 that is configured to generate a personal identification number (PIN), where the PIN is associated with the biometric template associated with the first end user. As described herein, in various embodiments, the BT management application 410 associated with a particular mobile computing device 106a can be employed to collect biometric data (e.g., fingerprint data) from an end user 402, generate a BT based on the biometric data, and generate a security PIN associated with the BT related to the end user 402. The PIN can be used in conjunction with the BT to authenticate the end user 402 on any one of the one or more mobile computing devices 106a-n.

The method 1200 also includes an operation 1210 that is configured to store at least one of the biometric template or the PIN associated with the first end user in an active biometric template database or an active PIN database respectively, where the active biometric template database and the active PIN database are associated with the MBTA system. For example, the BT management application 410 can cause the mobile computing device 106a to transmit a newly generated BT and/or PIN to the FTP server 316 for verification and storage. Additionally or alternatively, the MBTA system 100 can employ one or more APIs to move a BT data file and/or a PIN data file that has been uploaded to the FTP server 316 to a correct folder and/or storage location in the FTP server. For example, the BT data filet and/or the associated BT, and/or the PIN data file and/or the associated PIN can be stored in an active BT database and/or an active PIN list respectively associated with the MBTA system 100 (e.g., in the FTP server 316 and/or the MBTA database 108).

The method 1200 also includes an operation 1212 that is configured to transmit MBTA data for storage on a plurality of mobile computing devices that are different than the first mobile computing device, where the MBTA data comprises at least one of data related to the active biometric template database or data related to the active PIN database. As described herein, in various embodiments, the active BT database comprises a list of one or more BTs associated with one or more respective end users 402 that are currently enrolled in the MBTA system 100 and a representation (e.g., a structured list, a copy of the active BT database, and/or the like) associated with the active BT database is stored locally on the one or more mobile computing devices 106_a-n_. Additionally, in various embodiments, the active PIN database comprises a list of one or more PINs associated with one or more respective biometric templates (BTs) related to one or more respective end users 402 that are currently enrolled in the MBTA system 100 and a representation (e.g., a structured list, a copy of the active BT database, and/or the like) associated with the active PIN database is stored locally on the one or more mobile computing devices 106_a-n_.

As such, each active end user 402 currently enrolled and/or associated with the MBTA system 100 can authenticate themselves on any one of the one or more mobile computing devices 106_a-n_ by providing the biometric data associated with the end user 402 that was used to generate the BT to any respective mobile computing device of the one or more mobile computing devices 106_a-n_. As a non-limiting example, an end user 402 can provide biometric data such as a fingerprint (e.g., via the biometric hardware 438) and the BT management application 410 can determine whether the fingerprint matches a respective BT comprised in the active BT list stored locally on the mobile computing device 106_a_. If it is determined (e.g., via one or more biometric data matching algorithms) that the provided biometric data (e.g., the fingerprint) matches the respective BT comprised in the active BT list stored locally on the mobile computing device 106_a_ then the end user 402 will be allowed access to the mobile computing device 106_a_.

CONCLUSION

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VOIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile computing device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions which, when executed by the one or more processors, are configured to:
    receive a request to generate a biometric template associated with a first end user, wherein the request to generate the biometric template associated with the first end user is generated via a first mobile computing device associated with a multi-user biometric template authentication (MBTA) system;
    in response to receiving the request:
        collect biometric data associated with the first end user;
        generate, based on the biometric data, the biometric template associated with the first end user;

generate a personal identification number (PIN), wherein the PIN is associated with the biometric template associated with the first end user;
        store at least one of the biometric template or the PIN associated with the first end user in an active biometric template database or an active PIN database respectively, wherein the active biometric template database and the active PIN database are associated with the MBTA system; and
        transmit MBTA data for storage on a plurality of mobile computing devices that are different than the first mobile computing device, wherein the MBTA data comprises at least one of data related to the active biometric template database or data related to the active PIN database.

2. The system of claim 1, wherein the one or more programs further comprise instructions configured to:
authenticate, based in part on a first interaction with a second mobile computing device of the plurality of mobile computing devices, the first end user,
    wherein the first interaction with the second mobile computing device comprises collecting the biometric data associated with the first end user via the second mobile computing device and utilizing a biometric data matching algorithm to match the biometric data to the biometric template associated with the first end user, and
wherein the biometric template is comprised in the active biometric template database that has been stored on the second mobile computing device.

3. The system of claim 2, wherein the instructions configured to authenticate the first end user via the second mobile computing device further comprise instructions configured to:
authenticate, based in part on a second interaction with the second mobile computing device, the first end user,
    wherein the second interaction with the second mobile computing device comprises receiving the PIN associated with the biometric template associated with the first end user via the second mobile computing device and verifying the PIN based in part on data associated with the active PIN database that has been stored on the second mobile computing device.

4. The system of claim 1, wherein the one or more programs further comprise instructions configured to:
cause at least one of encryption or decryption of one or more biometric templates based in part on a symmetric shared secret.

5. The system of claim 4, wherein the symmetric shared secret is generated by a secrets management system associated with the MBTA system, and wherein the secrets management system is configured to distribute the symmetric shared secret to each respective mobile computing device of the plurality of mobile computing devices.

6. The system of claim 5, wherein the symmetric shared secret is imported into a biometric trusted application comprised within a trusted execution environment (TEE) of each respective mobile computing device of the plurality of mobile computing devices, and
wherein the symmetric shared secret is associated with a hash-based message authentication code associated with each respective mobile computing device of the plurality of mobile computing devices.

7. The system of claim 1, wherein the instructions to transmit the MBTA data for storage on the plurality of mobile computing devices are further configured to:

notify, via a message queuing telemetry transport (MQTT) broker associated with the MBTA system, the plurality of mobile computing devices that at least one of the active biometric template database or the active PIN database have been updated; and cause the plurality of mobile computing devices to obtain current data related to the at least one of the active biometric template database or the active PIN database.

8. The system of claim 7, wherein the instructions are further configured to:

remove at least one of one or more biometric templates or one or more PINs from the active biometric template database or the active PIN database respectively, wherein removing the at least one of the one or more biometric templates or the one or more PINs comprises:

notifying, via the MQTT broker associated with the MBTA system, the plurality of mobile computing devices that the at least one of the one or more biometric templates or the one or more PINs have been removed; and causing the plurality of mobile computing devices to obtain the current data related to the at least one of the active biometric template database or the active PIN database.

9. The system of claim 1, wherein the one or more programs further comprise instructions configured to:

remotely enable or disable an MBTA authentication mode on at least one of the first mobile computing device or the plurality of mobile computing devices.

10. The system of claim 1, wherein the MBTA data further comprises one or more extensible markup language (XML) configuration documents, and wherein the first mobile computing device and the plurality of mobile computing devices are configured in part by executing one or more commands associated with the one or more XML configuration documents.

11. The system of claim 10, wherein the one or more XML configuration documents are transmitted to the first mobile computing device and the plurality of mobile computing devices by a mobile device management tool associated with the MBTA system.

12. The system of claim 10, wherein the first mobile computing device and the plurality of mobile computing devices are configured to scan, via an optical engine, one or more barcodes associated with the one or more respective XML configuration documents, wherein scanning the one or more barcodes causes the first mobile computing device and the plurality of mobile computing devices to execute the one or more commands associated with the one or more respective XML configuration documents.

13. The system of claim 1, wherein the one or more programs further comprise instructions configured to:

authenticate, based in part on a first interaction with a third mobile computing device of the plurality of mobile computing devices, a second end user, wherein the first interaction with the third mobile computing device comprises collecting biometric data associated with the second end user via the third mobile computing device and utilizing a biometric data matching algorithm to match the biometric data associated with the second end user to a biometric template associated with the second end user, wherein the biometric template associated with the second end user was generated in response to receiving, by the MBTA system, a request to generate the biometric template associated with the second end user from a fourth mobile computing device, and wherein the biometric template associated with the second end user is comprised in the active biometric template database that has been stored on the third mobile computing device.

14. The system of claim 13, wherein the instructions configured to authenticate the second end user via the third mobile computing device further comprise instructions configured to:

authenticate, based in part on a second interaction with the third mobile computing device, the second end user, wherein the second interaction with the third mobile computing device comprises receiving a PIN associated with the biometric template associated with the second end user via the third mobile computing device and verifying the PIN based in part on data associated with the active PIN database that has been stored on the third mobile computing device.

15. A computer-implemented method, the computer-implemented method comprising:

receiving a request to generate a biometric template associated with a first end user, wherein the request to generate the biometric template associated with the first end user is generated via a first mobile computing device associated with a multi-user biometric template authentication (MBTA) system;

in response to receiving the request:

collecting biometric data associated with the first end user;

generating, based on the biometric data, the biometric template associated with the first end user;

generating a personal identification number (PIN), wherein the PIN is associated with the biometric template associated with the first end user;

storing at least one of the biometric template or the PIN associated with the first end user in an active biometric template database or an active PIN database respectively, wherein the active biometric template database and the active PIN database are associated with the MBTA system; and transmitting MBTA data for storage on a plurality of mobile computing devices that are different than the first mobile computing device, wherein the MBTA data comprises at least one of data related to the active biometric template database or data related to the active PIN database.

16. The computer-implemented method of claim 15, further comprising:

authenticating, based in part on a first interaction with a second mobile computing device of the plurality of mobile computing devices, the first end user, wherein the first interaction with the second mobile computing device comprises collecting the biometric data associated with the first end user via the second mobile computing device and utilizing a biometric data matching algorithm to match the biometric data to the biometric template associated with the first end user, and wherein the biometric template is comprised in the active biometric template database that has been stored on the second mobile computing device.

17. The computer-implemented method of claim 16, wherein authenticating the first end user via the second mobile computing device further comprises:

authenticating, based in part on a second interaction with the second mobile computing device, the first end user, wherein the second interaction with the second mobile computing device comprises receiving the PIN associated with the biometric template associated with the first end user via the second mobile computing device and verifying the PIN based in part on data associated with the active PIN database that has been stored on the second mobile computing device.

18. The computer-implemented method of claim 15, further comprising:

causing at least one of encryption or decryption of one or more biometric templates based in part on a symmetric shared secret.

19. The computer-implemented method of claim 18, wherein the symmetric shared secret is generated by a secrets management system associated with the MBTA system, and wherein the secrets management system is configured to distribute the symmetric shared secret to each respective mobile computing device of the plurality of mobile computing devices.

20. A computer program product comprising at least one non-transitory computer-readable storage medium having program instructions embodied thereon, wherein the program instructions are executable by a processor to cause the processor to:

receive a request to generate a biometric template associated with a first end user, wherein the request to generate the biometric template associated with the first end user is generated via a first mobile computing device associated with a multi-user biometric template authentication (MBTA) system;

in response to receiving the request:

collect biometric data associated with the first end user;

generate, based on the biometric data, the biometric template associated with the first end user;

generate a personal identification number (PIN), wherein the PIN is associated with the biometric template associated with the first end user;

store at least one of the biometric template or the PIN associated with the first end user in an active biometric template database or an active PIN database respectively, wherein the active biometric template database and the active PIN database are associated with the MBTA system; and transmit MBTA data for storage on a plurality of mobile computing devices that are different than the first mobile computing device, wherein the MBTA data comprises at least one of data related to the active biometric template database or data related to the active PIN database.

* * * * *